(12) United States Patent
Hu et al.

(10) Patent No.: US 11,616,718 B2
(45) Date of Patent: Mar. 28, 2023

(54) IMPLEMENTATION OF SERVICE FUNCTION CHAIN ON BASIS OF SOFTWARE-DEFINED NETWORK

(71) Applicant: NOKIA TECHNOLOGIES OY, Espoo (FI)

(72) Inventors: Zhiyuan Hu, Shanghai (CN); Duan Chen, Shanghai (CN); Zhigang Luo, Shanghai (CN)

(73) Assignee: NOKIA TECHNOLOGIES OY, Espoo (FI)

( * ) Notice: Subject to any disclaimer, the term of this patent is extended or adjusted under 35 U.S.C. 154(b) by 0 days.

(21) Appl. No.: 17/259,493

(22) PCT Filed: Jul. 11, 2018

(86) PCT No.: PCT/CN2018/095336
§ 371 (c)(1),
(2) Date: Jan. 11, 2021

(87) PCT Pub. No.: WO2020/010557
PCT Pub. Date: Jan. 16, 2020

(65) Prior Publication Data
US 2021/0273883 A1    Sep. 2, 2021

(51) Int. Cl.
*H04L 45/302* (2022.01)
*H04L 45/64* (2022.01)
(Continued)

(52) U.S. Cl.
CPC ............ *H04L 45/306* (2013.01); *H04L 45/64* (2013.01); *H04L 67/63* (2022.05); *H04L 69/22* (2013.01); *H04L 45/50* (2013.01); *H04L 69/18* (2013.01)

(58) Field of Classification Search
CPC ..... H04L 45/306; H04L 45/64; H04L 67/327; H04L 69/22; H04L 45/50; H04L 69/18; H04L 67/10
See application file for complete search history.

(56) References Cited

U.S. PATENT DOCUMENTS 9,654,395 B2   5/2017 Park et al.
2015/0131484 A1*  5/2015 Aldrin .................... H04L 43/50
                                                         370/254
(Continued)

FOREIGN PATENT DOCUMENTS

| CN | 105450552 A | 3/2016 |
| CN | 106130894 A | 11/2016 |
| WO | 2018/051172 A1 | 3/2018 |

OTHER PUBLICATIONS

International Search Report and Written Opinion dated Apr. 11, 2019 corresponding to International Patent Application No. PCT/CN2018/095336, and partial English translation thereof.
(Continued)

*Primary Examiner* — Charles C Jiang
*Assistant Examiner* — Shawn D Miller
(74) *Attorney, Agent, or Firm* — Squire Patton Boggs (US) LLP

(57) ABSTRACT

Example embodiments of the present disclosure relate to enablement of a service function chain based on a software defined network. In some embodiments, there is provided a method implemented at a service function chain controller. The method comprises creating a service function chain for a packet, the service function chain comprising a set of ordered service functions that are to process the packet; and configuring respective forwarding rules associated with the service function chain directly or indirectly to a plurality of network nodes in a software defined network, the respective forwarding rules indicating how the plurality of network
(Continued)

nodes forward the packet to the set of ordered service functions in the service function chain. In this way, it is possible to enable the service function chain in the software defined network.

25 Claims, 12 Drawing Sheets

(51) Int. Cl.
*H04L 69/22* (2022.01)
*H04L 67/63* (2022.01)
*H04L 45/50* (2022.01)
*H04L 69/18* (2022.01)

(56) References Cited

U.S. PATENT DOCUMENTS

| 2016/0080263 | A1 | 3/2016 | Park et al. |
| 2016/0352629 | A1* | 12/2016 | Wang ................ H04L 45/38 |
| 2017/0201629 | A1 | 7/2017 | Li et al. |
| 2018/0062984 | A1* | 3/2018 | Hill ................ H04L 45/306 |
| 2019/0173778 | A1 | 6/2019 | K et al. |

OTHER PUBLICATIONS

Open Networking Foundation. "L4-L7 Service Function Chaining Solution Architecture," ONF TS-027, Jun. 24, 2015.
R. Gu et al., "Service Function Chain Extension Architecture," IETF SFC draft-gu-sfc-extend-architecture-00., Mar. 8, 2015.
Extended European Search Report dated May 9, 2022 corresponding to European Patent Application No. 18925914.6.
First Office Action dated Apr. 7, 2022 corresponding to Chinese Patent Application No. 201880095531.X, with partial English Summary.
"Security guideline of Service Function Chain based on software defined network," IETF, Draft Recommendation X. sdnsec-3, Sep. 15, 2017, 12 pages.
Kim et al., "A Multiple Flow Tables Construction Scheme for Service Function Chaining in NFV", Information and Communication Network Technology UST (University of Science and Technology), Protocol Engineering Center ETRI (Electronics and Telecommunications Research Institute), Daejeon, Korea, pp. 113-115.
Quinn et al., "Network Service Header (NSH)", Internet Engineering Task Force (IETF), RFC: 8300, Category: Standards Track, ISSN: 2070-1721, Jan. 2018, 40 pages.
Halpern et al., "Service Function Chaining (SFC) Architecture", Internet Engineering Task Force (IETF), RFC: 7665, Category: Informational, ISSN: 2070-1721, Oct. 2015, 32 pages.

* cited by examiner

300 ⬎

| Flow Entry in Flow Table ||||||
|---|---|---|---|---|---|
| Match Fields ||| Egress Label | Instruction ||
| ^ ^ ^ ^ | Apply Action | Goto Flow Table |
| Ingress Port | Ingress Label | Dest. IP Addr. | | Update Packet Header | Egress Port | |

| Flow Entry for Classification of SFC |||||||||||
|---|---|---|---|---|---|---|---|---|---|---|
| Match Fields |||||| NSH |||| Next Hop | Instruction ||
| ^ ^ ^ ^ ^ ^ ^ ^ ^ ^ | Apply Action | Goto Table |
| Source IP Addr. | Dest. IP Addr. | Protocol Type | Ingress Port | Application Type | User Info. | SPI | SI | Next Protocol | Context Header | | Update Packet Header | Update Header Match Field | |

| Flow Entry for SFP Forwarding of SFC | | | | | |
|---|---|---|---|---|---|
| Match Fields | | Next Hop | Instruction | | |
| | | | Apply Action | | Goto Table |
| SPI | SI | | Update Packet Header | Update Header Match Field | Egress Port |
| | | | | Dest. IP Addr. | |

430 ─→

| Action Lable | Associated Data | Description |
|---|---|---|
| Push NSH Header | Ethernet Data | Insertion of a new NSH header to a packet |
| Pop NSH Header | --- | Removal of the NSH header from a packet |

500 ─→

710 ⤵

| Flow Table 0 in Node 220-1 (SFC Classification Table) ||||||||||||
|---|---|---|---|---|---|---|---|---|---|---|---|
| Match Fields |||| NSH |||| Next Hop | Instruction |||
| ^ | ^ | ^ | ^ | ^ | ^ | ^ | ^ | ^ | Apply Action || Goto Table |
| Source IP Addr. | Dest. IP Addr. | Protocol Type | Ingress Port | SPI | SI | Next Protocol | Context Header | ^ | Update Packet Header | Update Header Match Field / Dest. IP Addr. | ^ |
| 192.168.0.1 | 192.168.0.2 | IPV4 | 101 | 25 | 255 | 0X5(MPLS) | C1 | 202.0.0.11 | Push NSH Header | 202.0.0.11 | Flow Table 12 |
| 192.168.0.1 | 192.168.0.3 | IPV4 | 101 | 135 | 224 | 0X5(MPLS) | C2 | 202.0.0.13 | Push NSH Header | 202.0.0.13 | Flow Table 12 |
|  |  |  |  |  |  |  |  |  |  |  |  |

| Flow Table 12 in Node 220-1 ||||||
|---|---|---|---|---|---|
| Match Fields ||| Egress Label | Instruction ||
| ^ | ^ | ^ | ^ | Apply Action | Goto Table |
| Ingress Port | Ingress Label | Dest. IP Addr. | ^ | Update Packet Header / Egress Port | ^ |
| 101 | --- | 202.0.0.11 | 1000 | Push MPLS Label: 1000 / 102 | --- |
| 101 | --- | 202.0.0.13 | 2000 | Push MPLS Label: 2000 / 102 | --- |
|  |  |  |  |  |  |

| Flow Table 0 in Node 220-2 | | | | | | |
|---|---|---|---|---|---|---|
| Match Fields | | | Egress Label | Instruction | | |
| | | | | Apply Action | Egress Port | Goto Table |
| Ingress Port | Ingress Label | Dest. IP Addr. | | Update Packet Header | | |
| 201 | 1100 | --- | --- | Remove MPLS Label: 1000 | 202 | --- |
| 201 | 2100 | --- | 2200 | Exchange MPLS Label (2100-->2200) | 205 | --- |
| 203 | --- | --- | --- | --- | --- | Flow Table 1 |
| | | | | | | |

| Flow Table 1 in Node 220-2 (SFP Table) | | | | | | |
|---|---|---|---|---|---|---|
| Match Fields | | Next Hop | Instruction | | | |
| | | | Apply Action | | Egress Port | Goto Table |
| SPI | SI | | Update Packet Header | Update Header Match Field | | |
| | | | | Dest. IP Addr. | | |
| 25 | 254 | 202.0.0.12 | --- | 202.0.0.12 | --- | Flow Table 23 |
| | | | | | | |

| Flow Table 23 in Node 220-2 | | | | | | |
|---|---|---|---|---|---|---|
| Match Fields | | | Egress Label | Instruction | | |
| | | | | Apply Action | Egress Port | Goto Table |
| Ingress Port | Ingress Label | Dest. IP Addr. | | Update Packet Header | | |
| 203 | --- | 202.0.0.12 | 1200 | Push MPLS Label: 1200 | 204 | --- |
| | | | | | | |

| Flow Table 0 in Node 620-3 | | | | | | |
|---|---|---|---|---|---|---|
| Match Fields | | | Egress Label | Instruction | | |
| | | | | Apply Action | | Goto Table |
| Ingress Port | Ingress Label | Dest. IP Addr. | | Update Packet Header | Egress Port | |
| 301 | 1300 | --- | --- | Pop MPLS Label: 1300 | 302 | --- |
| 303 | --- | --- | --- | --- | --- | Flow Table 1 |
| | | | | | | |

| Flow Table 1 in Node 620-3 (SFP Table) | | | | | | |
|---|---|---|---|---|---|---|
| Match Fields | | Next Hop | Instruction | | | |
| | | | Apply Action | | Egress Port | Goto Table |
| SPI | SI | | Update Packet Header | Update Header Match Field | | |
| | | | | Dest. IP Addr. | | |
| 25 | 253 | 202.0.0.14 | --- | 202.0.0.14 | --- | Flow Table 34 |
| | | | | | | |

| Flow Table 34 in Node 620-3 | | | | | | |
|---|---|---|---|---|---|---|
| Match Fields | | | Egress Label | Instruction | | |
| | | | | Apply Action | | Goto Table |
| Ingress Port | Ingress Label | Dest. IP Addr. | | Update Packet Header | Egress Port | |
| 303 | --- | 202.0.0.14 | 1400 | Push MPLS Label: 1400 | 304 | --- |
| | | | | | | |

| Flow Table 0 in Node 620-4 |||| Instruction ||||
|---|---|---|---|---|---|---|---|
| Match Fields ||| Egress Label | Apply Action || Egress Port | Goto Table |
| Ingress Port | Ingress Label | Dest. IP Addr. | | Update Packet Header | | | |
| 401 | 1500 | --- | --- | Pop MPLS Label: 1500 | | 402 | --- |
| 403 | --- | --- | --- | --- | | --- | Flow Table 1 |
| | | | | | | | |

| Flow Table 1 in Node 620-4 (SFP Table) |||| Instruction |||
|---|---|---|---|---|---|---|
| Match Fields || Next Hop | Apply Action || Egress Port | Goto Table |
| SPI | SI | | Update Packet Header | Update Header Match Field — Dest. IP Addr. | | |
| 25 | 252 | 192.168.0.2 | Pop NSH Header | 192.168.0.2 | --- | Flow Table 45 |
| | | | | | | |

| Flow Table 45 in Node 620-4 |||| Instruction ||||
|---|---|---|---|---|---|---|---|
| Match Fields ||| Egress Label | Apply Action || Egress Port | Goto Table |
| Ingress Port | Ingress Label | Dest. IP Addr. | | Update Packet Header | | | |
| 403 | --- | 192.168.0.2 | --- | --- | | 404 | --- |
| | | | | | | | |

| Flow Table 0 in Node 620-5 | | | | | | |
|---|---|---|---|---|---|---|
| Match Fields | | | Egress Label | Instruction | | |
| | | | | Apply Action | | Goto Table |
| Ingress Port | Ingress Label | Dest. IP Addr. | | Update Packet Header | Egress Port | |
| 501 | 2300 | --- | --- | Pop MPLS Label: 2300 | 502 | --- |
| 503 | --- | --- | --- | --- | --- | Flow Table 1 |
| | | | | | | |

| Flow Table 1 in Node 620-5 (SFP Table) | | | | | | |
|---|---|---|---|---|---|---|
| Match Fields | | Next Hop | Instruction | | | |
| | | | Apply Action | | Egress Port | Goto Table |
| SPI | SI | | Update Packet Header | Update Header Match Field Dest. IP Addr. | | |
| 135 | 223 | 192.168.0.3 | Pop NSH Header | 192.168.0.3 | --- | Flow Table 56 |
| | | | | | | |

| Flow Table 56 in Node 620-5 | | | | | | |
|---|---|---|---|---|---|---|
| Match Fields | | | Egress Label | Instruction | | |
| | | | | Apply Action | | Goto Table |
| Ingress Port | Ingress Label | Dest. IP Addr. | | Update Packet Header | Egress Port | |
| 503 | --- | 192.168.0.3 | --- | --- | 504 | --- |
| | | | | | | |

FIG. 7N

IMPLEMENTATION OF SERVICE FUNCTION CHAIN ON BASIS OF SOFTWARE-DEFINED NETWORK

FIELD

Embodiments of the present disclosure generally relate to the field of network and in particular to enablement of a Service Function Chain (SFC) based on a Software Defined Network (SDN).

BACKGROUND

With the emergence of technologies such as Network Function Virtualization (NFV), Software Defined Network (SDN) and Service Function Chain (SFC), network operators can perform network transformation to make the network programmable with reduced costs. As a result, various applications can be deployed in an efficient and convenient way based on these technologies. The SDN technology allows service flows to be finely controlled at the network side, so it can support automatic and dynamic application deployment and reconfiguration. The SFC technology enables service providers to provide various service functions dynamically without changing the underlying network deployment. The service functions include network service functions such as mobility management and session management, authentication, firewall, intrusion detection system, deep packet detection, traditional IP network address translation (NAT), and the like in the mobile network. The SFC technology can also be utilized to provide application-specific functions.

Generally, the SDN technology and SFC technology are deployed separately. For example, to provide a dynamic service function, it is required to deploy, in the network, an SFC controller in a control plane and a classifier for managing service function chains for packets and a Service Function Forwarder (SFF) for implementing forwarding of the packets to corresponding service functions in a data plane. In a SDN-based network, it is required to deploy an SDN controller in the control plane and a switch supporting packet forwarding in the data plane.

SUMMARY

The summary of embodiments will be presented below to provide basic understanding of some aspects of various embodiments. It should be appreciated that the Summary is not intended to identify key points of key elements or describe the scope of various embodiments. The Summary only aims to present some concepts in a simplified form, as a prelude to the following more specific depictions.

In a first aspect, there is provided a method implemented at a service function chain controller. The method comprises: creating a service function chain for a packet, the service function chain comprising a set of ordered service functions that are to process the packet; and configuring respective forwarding rules associated with the service function chain directly or indirectly to a plurality of network nodes in a software defined network, the respective forwarding rules indicating how the plurality of network nodes forward the packet to the set of ordered service functions in the service function chain.

In a second aspect, there is provided a method implemented at a network node in a software defined network. The method comprises: receiving a packet from an upstream node in the software defined network; obtaining, from a service function chain controller, a forwarding rule associated with a service function chain associated with the packet, the service function chain comprising a set of ordered service functions that are to process the packet, and the forwarding rule indicating how the network node forwards the packet to a service function in the set of ordered service functions; and forwarding, based on the forwarding rule, the packet to a downstream node communicatively coupled with a service function in the set of ordered service functions.

In a third aspect, there is provided a method implemented at a software defined network controller. The method comprises: receiving, from a service function chain controller, respective forwarding rules associated with a service function chain created for a packet, the service function chain comprising a set of ordered service functions that are to process the packet, the respective forwarding rules indicating how a plurality of network nodes in a software defined network forward the packet to the set of ordered service functions in the service function chain; and providing the respective forwarding rules to the plurality of network nodes.

In a fourth aspect, there is provided a communication device. The device comprises: a processor; and a memory having instructions stored therein, the instructions, when executed by the processor, causing the device to perform the method according to the first aspect, the second aspect, or the third aspect.

In a fifth aspect, there is provided a computer readable storage medium having a computer program stored thereon, the computer program, when executed by a processor, implementing the method according to the first aspect, the second aspect, or the third aspect.

It is to be understood that the Summary is not intended to identify key or essential features of embodiments of the present disclosure, nor is it intended to be used to limit the scope of the present disclosure. Other features of the present disclosure will become easily comprehensible through the following description.

BRIEF DESCRIPTION OF THE DRAWINGS

The objects, advantages and other features of the present disclosure will become more apparent from the following disclosure and claims. Here, for the purpose of illustration only, non-limiting depictions of preferred embodiment are presented with reference to the figures, where:

FIG. 3 illustrates an example structure diagram of a flow table for forwarding a label protocol-based packet in an SDN network;

FIG. 4A and FIG. 4B illustrate example block diagrams of a flow table for packet forwarding in the system of FIG. 2 according to an embodiment of the present disclosure;

FIG. 4C illustrates an example of a processing action defined in a flow entry according to an embodiment of the present disclosure;

FIG. 5 illustrates an example structure of a path label according to an embodiment of the present disclosure;

FIG. 7A to 7N illustrate example structure diagrams of a flow table used in the example of FIG. 6;

Throughout the drawings, the same or similar reference numerals represent the same or similar element.

DETAILED DESCRIPTION

Various details are presented in the following depictions for the purpose of illustration. However, those skilled in the art should appreciate that the present disclosure may be implemented without these specific details. Hence, the present disclosure is not intended to be limited to the illustrated embodiments, but endowed the broadest scope consistent with the principles and features described herein.

It shall be understood that "first," "second" and the like are only used to distinguish one element from another element. In fact, a first element can also be referred to as a second element, vice versa. In addition, it should further be appreciated that the terms "include" and "comprise" are only used to indicate the presence of the stated feature, element, function and component, and do not exclude the presence of one or more other features, elements, functions and components.

Figure 1:
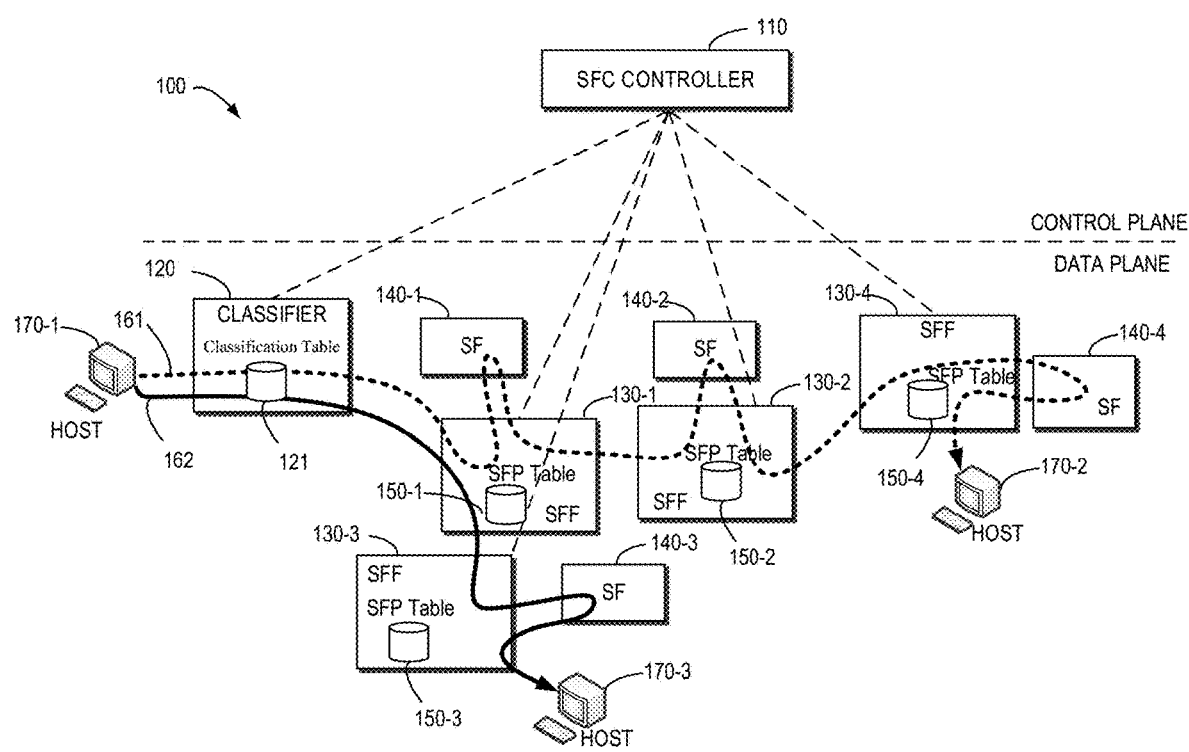
FIG. 1 illustrates an example architecture diagram of a typical system for providing SFC.

FIG. 1 illustrates an example architecture diagram of a typical system 100 for providing a SFC. The system 100 may include one or more controllers in a control plane that may be distributed onto one or more physical hosts and/or virtual hosts. As shown in FIG. 1, the system 100 may include a service function chain (SFC) controller 110.

As shown in FIG. 1, the SFC controller 110 may communicate with nodes on a data plane and configure the nodes in the data plane. For example, the data plane may include a classifier 120, one or more service function forwarders (SFFs) 130-1, 130-2, 130-3 and 130-4 (collectively referred to as SFFs 130 for ease of description), and corresponding service functions (SFs) 140-1, 140-2, 140-3, 140-4, and so on (collectively referred to as SFs 140 for ease of description).

In the system 100 which provides the SFC, the classifier 120 provides a classification function to classify a packet to a matched service function chain (SFC). A classification policy may be user-specific, network-specific, or service-specific. The classifier 120 may include a classification table 121 for determining the match of the packet to the SFC.

A SF 140 is used to perform specific processing on the received packet. A SF 140 may be a logical element, which may be implemented as a virtual element in a physical network device or embedded therein. A SF 140 may provide a general-purpose network service function or an application-specific function. Examples of the SF 140 may include, but are not limited to, a firewall, access control, entity authentication, Unified Threat Management (UTM), an intrusion detection system (IDS), an intrusion prevention system (IPS), a virtual private network (VPN), a security gateway, deep packet detection (DPI), lawful intercepting (LI), traffic cleaning, data integrity verification, data confidentiality protection, data desensitization, data encryption, data decryption, and so on.

A SFF 130 is used to forward a packet to a SF 140 connected thereto, and receive the processed packet from the SF 140. The SFFs 130 may each include one of service function path (SFP) tables 150-1, 150-2, 150-3 and 150-4 (generally referred to as SFP tables 150 for ease of description). A SFF 130 determines how to forward the packet based on a SFP table 150. A SFF 130 may be implemented as a virtual element in a physical network device or embedded therein.

In the system 100, the SFC controller 110 may create a service function chain (SFC) for the packet. The SFC may sometimes also be briefly referred to as a service chain (SC). Each SFC includes a set of ordered SFs 140. Packets classified to a specific SFC will be processed by the SFs 140 involved in that chain. If all the SFs in a SFC include data security functions, this SFC may also be referred to as a secure service chain (SSC).

In the example of FIG. 1, two SFCs are shown and used for packets transmitted from a host 170-1 to a host 170-2, and packets transmitted from the host 170-1 to a host 170-3, respectively. Paths of the two SFCs are corresponding to SFPs 161 and 162, respectively, where the SFP 161 involves: host 170-1→classifier 120→SFF 130-1→SF 140-1→SFF 130-1→SFF 130-2→SF 140-2→SFF 130-2→SFF 130-4→SF 140-4→SFF 130-4→host 170-2. The SFP 162 involves: host 170-1→classifier 120→SFF 130-1→SFF 130-3→SF 140-3→SFF 130-3→host 170-3. In the SFP 161, packets from the host 170-1 to the host 170-2 are processed by an SFC comprising a set of ordered SFs 140-1, 140-2, 140-3 and 140-4. In the SFP 162, packets from the host 170-1 to the host 170-3 are processed by an SFC comprising the SF 140-3.

It should be appreciated that the architecture of the system 100 shown in FIG. 1 is only an example. In practical applications, the system 100 may include more, fewer, or different components.

In the network deployment, there is network communication implemented based on the Software Defined Network (SDN) technology. An SDN controller and one or more switches are included in the SDN network. The SDN controller controls the switches to forward packets according to a specified control protocol, such that the switches can transmit the packets from their source addresses to their destination addresses. The core of the SDN network is to separate a control plane from a data plane of the network devices, to achieve flexible control of network traffic and make the network become more intelligent as a pipeline.

As mentioned above, the SDN technology and the SFC technology are deployed separately. The SFC controller and the SDN controller control their elements of data plane separately to perform corresponding functions. It is desirable to use the network devices in the SDN network to implement the SFC, thereby gaining advantages of the two technologies.

According to embodiments of the present disclosure, there is proposed a solution for implementing the SFC based on the SDN. In this solution, SFC components (such as the classifier and SFFs) supporting a SFC are implemented as forwarding rules such as flow tables at network nodes in a SDN network. The forwarding rules indicate how the network nodes forward packets to SFs of the corresponding SFC. The SFC controller may communicate with a SDN controller or the network nodes to configure such forwarding rules to the network nodes. Embodiments of the present disclosure will be described in detail below with reference to the figures.

Figure 2:
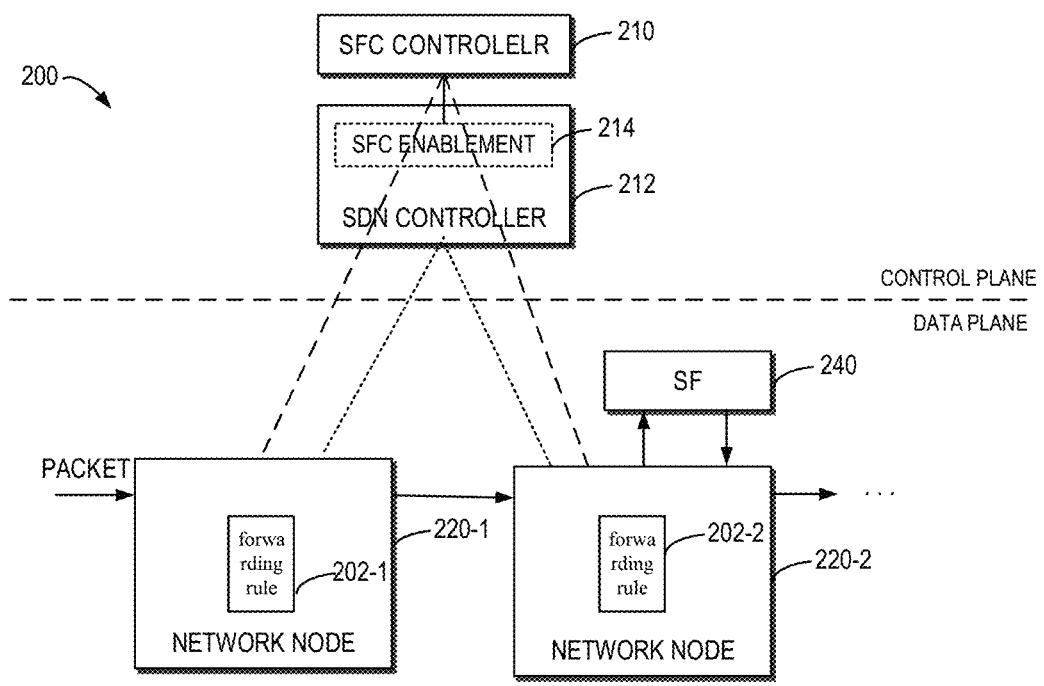
FIG. 2 illustrates an example architecture diagram of a system for implementing SFC based on SDN according to an embodiment of the present disclosure.

FIG. 2 illustrates an example architecture diagram of a system 200 for implementing the SFC based on the SDN according to an embodiment of the present disclosure. In the system 200, a control plane includes an SFC controller 210 for controlling SFCs of packets. The control plane further includes an SDN controller 212 for controlling network nodes (such as network nodes 220-1, 220-2, and so on) in a SDN network. The network nodes 220-1 and 220-2 may be collectively referred to as network nodes 220, which are responsible for forwarding the packets. A network node 220 may sometimes be referred to as a network device, a switch, a switching device, or the like. The network node 220-2 is further connected to a SF 240-1. The SF 240-1 is used for processing the packets to provide specific service functions.

It should be appreciated that the number and deployment of the devices shown in FIG. 2 are only one example. In other cases, the system 200 may further include more network nodes and more SFs, and each network node may be connected to more than one SF.

The SDN controller 212 and the network nodes 220 in the SDN network may interact with each other according to various control protocols. An example of a control protocol is an OpenFlow protocol. According to this protocol, a network node 220 may also be referred to as an OpenFlow switch, and the SDN controller 212 may also be referred to as an OpenFlow controller. Other protocols supporting the interaction between the control plane and the data plane may also be employed, such as a Virtual Extended Local Area Network (VXLAN) protocol. Hereinafter, the embodiments of the present disclosure will be described with the OpenFlow protocol as an example, but it should be appreciated that these embodiments may also applicable in the cases where the SDN controller 212 and the network nodes 220 utilize other communication protocols. It should also be noted that in communications based on the OpenFlow protocol, communicating a packet may also be referred to as communicating a data stream.

In operation, the SFC controller 210 creates an SFC for a packet, which includes a set of ordered SF(s) (a SF 240-1 in the example of FIG. 2) that are to process the packet. The SFC may be user-specific, application-specific, network-specific, or the like. In this case, all the packets from a specific user or a specific application or to be transmitted in a specific network (e.g., the system 200) will be processed by the SF in this SFC. The SFC controller 210 configures respective forwarding rules associated with the created SFC to the network nodes 220 in the SDN. The forwarding rules indicate how the network nodes 220 forward the packet to each SF in the created SFC. The forwarding rules associated with the created SFC may involve forwarding by a plurality of network nodes, so the SFC controller 210 may configure the respective forwarding rules to each of the network nodes 220, and the forwarding rule obtained by each of the network nodes 220 specifies a forwarding operation of a packet by the network node 220 itself.

In a simple SFC implementation, after the SFC is created, a packet for this SFC is classified by the classifier to the SFC and provided to the corresponding SFF, and then forwarded to the corresponding SF for processing via the SFF. In order to implement such a function in the SDN, according to the embodiments of the present disclosure, the transmission of the packet to the SFC by the classifier and the SFF is configured as the forwarding rules of the network nodes in the SDN. After being configured with such forwarding rules, the network nodes 220 will forward a packet based on the forwarding rules so that the packet can be correctly transmitted to the SF(s) involved in the SFC created by the SFC controller 210.

As shown in FIG. 2, the network node 220-1 may receive a packet from an upstream node. The upstream node that provides the packet to the network node 220-1 may be a host device or other user device that generates the packet. The network node 220-1 forwards the packet to a downstream network node 220-2 (also referred to as a next hop) based on a forwarding rule 202-1 configured by the SFC controller 210. The network node 220-2 is connected to the SF 240-1. The network node 220-2 may provide, based on a configured forwarding rule 202-2, the packet to the SF 240-1 for processing and forward the packet to a downstream node, also referred to as a next hop (e.g., a next network node or a destination device of the packet).

The SFC controller 210 may directly or indirectly configure the forwarding rules to the network nodes 220. In some embodiments, the SFC controller 210 may transmit the forwarding rules directly to the network nodes 220. In an example where the network node 220 is an OpenFlow switch, the SFC controller 210 may communicate directly with the network nodes 220 using, for example, an extended NETCONF protocol, to transmit the forwarding rules to the network nodes 220. In such an embodiment, there is no need to change the communication protocol between the SDN controller 212 and the network nodes 220.

Alternatively, the SFC controller 210 may provide the forwarding rules to the network nodes 220 via the SDN controller 212. In other words, the SDN controller 212 serves as a communication proxy between the SFC controller 210 and the network nodes 220 so as to enable indirect configuration of the forwarding rules. In such an implementation, the SDN controller 212 may include an SFC enablement module 214 for enabling communication with the SFC controller 210. The SFC controller 210 transmits the forwarding rules to the SDN controller 212 (for example, the SFC enablement module 214 therein). After obtaining the forwarding rules, the SDN controller 212 transmits the forwarding rules to the network nodes 220 according to a communication protocol with the network nodes 220 (e.g., the OpenFlow protocol). The conventional communication between the SDN controller 212 and the network nodes 220 may need to be changed to support the transmission of the forwarding rules. For example, a message configuration transmitted between the SDN controller 212 and the network nodes 220 needs to be updated to support the transmission of the forwarding rules associated with the SFC.

In some embodiments, in order to create the SFC and generate the forwarding rules, the SFC controller 210 further requests for network-related information from the SDN controller 212, such as network topology information. The network topology information indicates the topology between the network nodes 220 in the system 200, between the network nodes 220 and the host devices that initiate and receive the packet, and between the network node 220 and the SF 240-1. The SFC controller 210 sends a request for the network topology information to the SDN controller 212. In response to the request, the SDN controller 212 transmits the network topology information to the SFC controller 210. The SFC controller 210 may create the SFC based on the network topology information. The network topology information may indicate the deployment of the SF(s) in the network, the network nodes connected thereto, and so on, which may be helpful for the generation of the SFC by the SFC controller 210. When configuring the forwarding rules, the SFC controller 210 may refer to the obtained network topology information, for example, to make the forwarding rules indicate which network node can forward the packet to which SF in what way. All communications related to the SFC controller 210 may be implemented by the SFC enablement module 214 in the SDN controller 212.

In some embodiments, the SFC controller 210 may also request for information related to a deployment status and an operation status of the network nodes 220 and/or the SF 240-1 to support the creation of the SFC and the configuration of the forwarding rules. The deployment status of the network nodes 220 and/or the SF 240-1 may be obtained from, for example, a Management and Orchestration (MANO) device. The MANO device (not shown in FIG. 2) is responsible for performing virtual machine (VM) management and administration, maintenance, and provisioning of virtualized network functions in the SDN. The MANO device may provide the deployment status and the operation status of the network nodes 220 and/or SF 240-1 to the SFC controller 210, such as the throughputs, latency and IP addresses of those nodes, and flexibility and availability of the running service functions, and the like.

In the following it will be discussed in detail how the SFC controller 210 configures the forwarding rules so that the network nodes 220 are enabled to forward a packets to the corresponding SF(s) that is included in a specific SFC. In an implementation of the SFC, a classification function is needed to implement the classification of the packet to the corresponding SFC. In addition, service function forwarding (SFF) is also needed to implement the transmission of the packet classified to the corresponding SFC along the SFP, so as to provide the packet to the corresponding SF(s) for processing. In the implementations of the SDN-based SFC, both the classification function and the SFF function are configured as the forwarding rules in the network nodes 220.

In an SDN network based on the OpenFlow protocol, a network node 220 performs the forwarding of a packet based on a flow table. In a conventional SDN network, the SDN controller configures the flow table. The flow table includes one or more flow entries, each indicating an action to be performed by the network node on the packet. After receiving the packet, the network node 220 looks up the flow table to determine the flow entry that matches the packet and performs a corresponding action based on the flow entry, such as encapsulation or de-capsulation of a packet header, multipath forwarding, output to one or more ports, going to another flow table for further processing, and/or the like.

FIG. 3 illustrates an example structure of a flow entry 300 in a flow table for forwarding a label protocol-based packet in an SDN network. The flow entry 300 includes match fields in which information for packet matching (also referred to as match information) is recorded. If a packet contains information that matches one or more items of information in the match fields of a flow entry, it means that this packet matches the flow entry. In the example of FIG. 3, the match fields include fields of ingress port, ingress label, and destination Internet Protocol (IP) address. The ingress port indicates a port at which a packet is input to the network node. The ingress label indicates a label that indicates a switching path from which the network node receives the packet in the implementation where the SDN controller indicates the forwarding by the network node according to a path label service. The label for the path may, for example, include a Multi-Protocol Label Switching (MPLS) label, a Generic Routing Encapsulation (GRE) label, a Virtual Extensible Local Area Network-Generic Routing Encapsulation (VXLAN-GRE) label, and the like.

The ingress label may further indicate an input path of the packet. The destination IP address in the match fields indicates an IP address of the destination to which the packet will be forwarded. Although multiple fields are included, depending on actual forwarding requirements, one or more items of the match fields of the flow entry 300 may not be configured with the corresponding information. The match fields may further include other information for matching, such as a source IP address, a source port number, a destination IP address, a destination port number, a protocol type, and an ingress port number of the packet.

As shown in FIG. 3, the flow entry 300 further includes an egress label field to indicate a label of a path via which the network node outputs the packet in the implementation where the SDN controller indicates the forwarding by the network node according to the path label service. The flow entry 300 further includes instruction fields indicating corresponding operations to be performed by the network node. An "Apply Action" portion of the instruction fields may include an "Update Packet Header" field, which indicates a corresponding operation on the packet header, such as insertion of specific information, removal of specific information, and the like. The "Apply Action" portion may further include an "Egress Port" field which indicates that the network node will output the packet from an egress port indicated in this field. In some examples, the instruction field of the flow entry 300 may further include a "Goto Table" field. This field is usually used when the network node includes a plurality of flow tables. If the network node includes a plurality of flow tables, the network node may need to perform pipeline processing of the flow tables. In other words, after the packet is processed according to a flow entry of a flow table, if the "Goto Table" field of the flow entry indicates a next flow table, the network node may continue to process the packet according to a matched flow entry in the next flow table.

The flow entry of the flow table shown in FIG. 3 is only an example. The flow entries may also have other variations according to the OpenFlow protocol.

In some embodiments of the present disclosure, to support the enablement of the SFC in the SDN, the SFC controller configures the forwarding rules associated with the SFC created for the packet as flow entries in the network nodes. Compared with the conventional flow entry, in order to support the classification function and SFP forwarding function required by the SFC, the flow entry in the flow table need to be extended or modified. In the following, examples of the flow entries for supporting the classification and SFP forwarding needed by the SFC are described with reference to the examples of FIGS. 4A and 4B. The SDN controller 212 may extend the flow table of the network node 220 to support such flow entries.

FIG. 4A illustrates a flow entry 410 for classification of a SFC. The flow entry 410 includes a new Network Service Header (NSH) field to indicate a NSH of the packet. In the classification of the SFC, after the packet is classified to the created SFC, the packet will be encapsulated with a NSH. The format of the NSH may be, for example, a header format defined in a protocol related to the SFC, such as a header defined in an IETF RFC8300 protocol. Generally, the NSH may include an identifier of the SFC, such as a Service Path Identifier (SPI), a Service Index (SI), and the like. The NSH may further include a "next protocol" field indicating a protocol type of the data (payload) encapsulated in the packet. The NSH may further optionally include a "context header" field indicating metadata (i.e., context data) of the SFC. The NSH has different types, and the structure of the NSH shown in FIG. 4A is only an example. According to the definition of the SFC-related protocol, the NSH may include more information, different information, or less information (for example, the next protocol field and the context header field may be omitted).

The flow entry 410 may further include a new "next hop" field indicating a next SF in a set of ordered SFs to which the packet is to be forwarded, which may, for example, include the address of the next SF. The indication in the "next hop" field is usually done according to the position of the next hop in the Service Packet Path (SFP) of the SFC, which may be indicated according to the SPI and SI. The "next hop" field may also be consistent with packet transfer in the SFC as defined in the SFC-related protocol, e.g., defined in the IETF RFC8300 protocol. The "next hop" of the SFC may be used for transmitting a NSH-encapsulated packet in a transmission path established based on the underlying network protocol. Generally, upon classification, the "next hop" field in the flow entry 410 indicates the first SF in the set of ordered SFs of the SFC. In some embodiments, according to the indication of the "next hop," a forwarding path, such as a Label Switched Path (LSP), may be established between the current network node and the node associated with the "next hop." For some SFCs, a plurality of LSPs (e.g., if a plurality of SFs are included) may need to be established. The plurality of LSPs may constitute the forwarding of the packet in the whole network.

In some embodiments, the flow entry 410 may further indicate some specific processing actions on the packet. As described with respect to FIG. 3, the conventional flow entry includes the instruction field, where the "Apply Action" portion defines the processing actions that the network node needs to perform on the packet. Considering the enablement of the SFC, the processing actions to be performed by the network node may be extended. In some implementations, the flow entry 410 may indicate a processing action associated with the SFC-related header (i.e., the NSH header). In the implementation of the classification function, the action field of the "Update Packet Header" of the flow entry 410 may be extended to indicate a processing action of inserting a NSH into the packet. The insertion of the NSH is usually performed when the packet is classified to the path of the SFC.

The "Apply Action" of the flow entry 410 may further include an additional action field "Update Header Match Field" to indicate a processing action of replacing a destination address of the packet with an address of the SF indicated by the next hop. By applying this processing action, the destination address of the packet is replaced to facilitate establishment of an LSP with the next hop.

In some embodiments, in order to support more refined classification of packets, the match fields of the flow entry 410 may further include additional match information in the SFC scenario in addition to the conventional match information of the flow table (such as a source IP address, a source port number, a destination IP address, a destination port number, a protocol type, and an ingress port number of the packet, and the like). An example of the additional match information may include an application type of the packet, indicating a type of an application that generates the payload in the packet. The additional match information may also include user information of the packet, indicating information related to the user who initiates the packet or to the host device of the user. One or more items of the match information may be configured. Therefore, the flow entry in the conventional flow table of the SDN is extended to include the above-mentioned types of field to carry the additional configuration information. For example, in the specification of the OpenFlow protocol, the match fields may be extended to include a field type "OFPXMT_OFB_APPLICATION_TYPE=xx, /*Application type. */," to indicate that the application type of the packet is carried in the match fields. The match fields may further be extended to include a field type "OFPXMT_OFB_USER_INFORMATION=xx, /* User information. */" to indicate that the user information of the packet is carried in the match fields.

In some embodiments, if the flow entry 410 is set to a network node with a plurality of flow tables, the flow entry 410 further includes a "Goto Table" field to indicate a next table in pipeline processing of the flow tables at the network node. In some embodiments, in the pipeline processing of the flow tables at the network node, the flow table containing the flow entry 410 may be the second flow table in the pipeline processing.

FIG. 4A illustrates an example structure of a flow entry for the classification of the SFC. After creating the SFC, the SFC controller 210 may configure, based on the created SFC, flow entries for the classification of the SFC to the flow tables at the respective network nodes. In a case where the network node 220 includes a plurality of flow tables, the flow table configured with the flow entry for the classification as illustrated in FIG. 4A may be used together with other flow tables in the pipeline processing of the flow tables.

Figures 4B, 4C, 5:
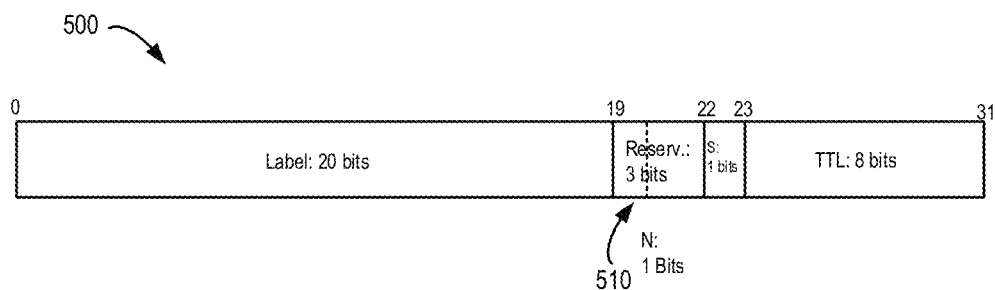

FIG. 4B illustrates a flow entry 420 for SFP forwarding of SFC. In the conventional SFC, SFP forwarding is usually implemented by a component such as the SFF. In the embodiments of the present disclosure, the SFF forwarding function is implemented as a flow entry in a flow table of a network node. The flow entry 420 is used to cause a network node 220 to forward the packet to a corresponding SF for processing, and further forward a packet returned after the packet is processed by the SF to the next node.

As shown in FIG. 4B, the flow entry 420 indicates an identifier of the SFC, which may be included in the match fields of the flow entry 420 as match information. The identifier of the SFC may include SPI and/or SI. In SFP forwarding, the received packet is usually encapsulated with an NSH header, which contains the identifier of the SFC (i.e., SPI and/or SI). Therefore, in the match fields of the flow entry, the SFC identifier may be used to determine whether the packet matches this entry. In some embodiments, the match fields of the flow entry 420 may include other match information in addition to the identifier of the SFC, such as the above match information described with respect to FIG. 3 or FIG. 4A. Therefore, the flow entry in the conventional flow table of the SDN is extended to include the above-mentioned field types to carry the additional configuration information. For example, in the specification of the OpenFlow protocol, the match fields may be extended to include a field type "OFPXMT_OFB_NSH_SPI_LABEL=xx, /* NSH SPI label. */" to indicate that an SPI identifier for the SFC is carried in the match fields. The match fields may further be extended to include a field type "OFPXMT_OFB_NSH_SI_LABEL=xx, /*NSH SI label. */" to indicate that an SI identifier for the SFC is carried in the match fields.

In some embodiments, similar to the flow entry 410, the flow entry 420 may further include a new "next hop" field to indicate a next SF in the set of ordered SFs to which the packet is to be forwarded, for example, to include an address of the next SF. The "next hop" field may also be consistent with the definition in the SFC-related protocol, e.g., as defined in the IETF RFC8300 protocol. The "next hop" of the SFC may be used for transmitting the NSH-encapsulated packet in a transmission path established based on the underlying network protocol. Generally, upon SFP forwarding, the "next hop" field in the flow entry 420 indicates a certain intermediate SF or the last SF in the set of ordered SFs of the SFC. In some embodiments, according to the indication of the "next hop," a forwarding path, such as a Label Switched Path (LSP), may be established between the current network node and the node associated with the "next hop."

In some embodiments, the flow entry 420 may further indicate some specific processing actions on the packet. In some implementations, the flow entry 420 may indicate a processing action associated with a SFC-related header (i.e., the NSH header). In the implementation of the SFP function, the action field of the "Update Packet Header" of the flow entry 410 may be extended to indicate a processing action of removing the NSH from the packet. The removal of the NSH header is usually performed when the SF to be provided for packet processing does not support the SFC, when the packet is to be provided to the destination device, when the next hop in the network does not support the SFC, or when the packet is about to leave the SFC domain.

The "Apply Action" of the flow entry 420 may further include an additional action field "Update Header Match Field" to indicate a processing action of replacing a destination address of the packet with an address of the SF indicated by the next hop. By applying this processing action, the destination address of the packet is replaced to facilitate establishment an LSP with the next hop.

In some embodiments, if the flow entry 420 is set to a network node with a plurality of flow tables, the flow entry 420 further includes a "Goto Table" field to indicate a next table in pipeline processing of the flow tables at the network node. In some embodiments, in the pipeline processing of the flow tables at the network node, the flow table containing the flow entry 410 may be the second flow table in the pipeline processing.

The flow table for classification and the flow table for SFP forwarding are discussed above with reference to FIG. 4A and FIG. 4B. In the examples of FIG. 4A and FIG. 4B, in order to support the enablement of the SFC, the flow entry may further indicate processing actions related to the NSH. These actions are summarized in a table 430 in FIG. 4C. As shown in FIG. 4C, the flow entry may include action labels "Push NSH Header" and "Pop NSH Header" to indicate insertion of a new NSH header to a packet and removal of the NSH header from a packet, respectively. The table 430 further indicates a type of data associated with the action label "Push NSH Header," for example, a type of Ethernet data.

In some embodiments, as mentioned above, upon forwarding between the network nodes 220, the SDN controller 212 may control the network nodes to implement forwarding of a packet according to the path labels. The SDN controller 212 may create a forwarding path of the SDN for transmission of the packet in the SDN based on the forwarding rules. For example, the SDN controller 212 may map a SFC path (i.e., SFP) created for the SFC controller 210 to a Multi-Protocol Label Switching (i.e., MPLS) path in the SDN.

Generally, a protocol of a path label, such as the MPLS protocol, is independent from the network layer protocol. The SDN controller 212 may include an MPLS management module and a Path Computation Element (PCE) server (control element) for determining a Label Switched Path (LSP) between the network nodes 220 for the MPLS. The network nodes 220 may include PCE clients to support MPLS-based switched path forwarding. The network nodes 220 may perform packet forwarding based on the ingress label or egress label of the packet. In such an implementation, the SDN controller 212 and the network nodes 220 may support the PCE communication protocol, such as protocol specifications defined in IETF RFC 4665 and IETF RFC 5440. The MPLS management may also be implemented according to a corresponding protocol specification, such as IETF RFC3209.

In forwarding based on the path label, if the NSH header is inserted into the packet, a label indicating the multi-protocol label switched path may indicate whether there is a HSN header in the packet. FIG. 5 illustrates an example structure 500 of a MPLS-based path label. Generally, the path label 500 includes a label field which indicates a label value with a length of 20 bits, for example. The path label 500 may further include a reserved field, also referred to as an experimental use field reserved for experimental use, which may have a length of 3 bits, for example. The path label 500 may further include an S field, which indicates a bottom of a label stack, with a length of 1 bit. The S field is used in the case of label stack (for example, when there are a plurality of path labels). The path label 500 further includes a Time to Live (TTL) field to indicate the living time of the path label 500, which may have a length of 8 bits. In the implementation of the SFC, during the forwarding of a packet, an indication of the presence of the NSH header in the packet may be added to the path label. For example, a one-bit portion 510 (represented by "N") in the reserved field of the path label 500 may be used to indicate that the NSH header is present in the packet. This means that the payload of the packet and the NSH header inserted therein need to be forwarded when the network node performs the forwarding.

It has discussed above how to configure the flow entry for a network node as a forwarding rule associated with the SFC when the SFC is implemented in the SDN. Generally, the packet is first received by a network node 220 in the data plane. If there is no flow entry for forwarding the packet in the network node 220, the network node 220 will determine that a SFC matching the packet is not found and the packet fails to be forwarded. In this case, the network node 220 provides the SFC controller 210 with an indication that no SFC matching the packet is found. For example, the network node 220 may transmit the header information in the packet having no matched SFC directly to the SFC controller 210 or forward the header information to the SFC controller 210 via the SDN controller 212. The direct communication between the network node 220 and the SFC controller 210 may be implemented according to an extended NETCONF protocol, for example. If forwarded via the SDN controller 212, a packet may be provided from the network node 220 to the SDN controller 212 via a "Packet-in" message. In other implementations, the network node 220 may also provide an indirect indication that the packet fails to be forwarded in absence of the matched SFC.

In response to obtaining, from the network node 220, the indication that the packet fails to be forwarded in absence of the matched SFC (for example, obtaining the packet that cannot be forwarded itself or the header information of the packet), the SFC controller 210 may create a SFC for the packet, and configure a forwarding rule associated with the created SFC to the network node 220 from which the packet is obtained, and other network nodes 220 involved in forwarding the packet to the service function(s) in the SFC.

It has been discussed in the above embodiments how to configure forwarding rules (for example, flow entries in flow tables) for the network nodes 220. In some embodiments, depending on the application, the SFC controller 210 may update or delete the corresponding SFC. In this case, the SFC controller 210 configures the forwarding rules associated with the updated SFC to the network nodes 220, and instructs the network nodes 220 to discard the forwarding rules associated with the old or deleted SFC. Such a communication between the SFC controller 210 and the network nodes 220 may also be performed directly or completed via the SDN controller 212.

In some embodiments, in addition to being configured with the forwarding rules (for example, flow entries in the flow tables), the network nodes 220 may forward the packet based on the forwarding rules so that the packet can be forwarded to the SF(s) involved in the corresponding SFC for processing. It should be appreciated during the forwarding of the packet by the network nodes 220, in addition to the flow entries of the flow tables for the SFC classification and the SFP forwarding functions, the network node 220 may be further configured with other flow entries to perform the packet forwarding between the network nodes, between the network nodes and the SF, and between the network nodes and the host device.

Upon forwarding based on a flow entry, a network node 220 may extract a header of the packet and determine whether the header contains match information indicated by the flow entry. If the header contains such match information, this means that the packet matches the flow entry. In this case, the network node 220 may process the packet based on the matched flow entry. The processing of the packet may be performed based on the information in the instruction field of the flow entry.

In the example of FIG. 2, the network node 220-1 may be configured with a forwarding rule related to the classification function of the SFC, such as a flow entry indicating information as shown in FIG. 4A. The network node 220-1 may determine how to forward the packet based on such a flow entry. Specifically, if the network node 220-1 determines that the header of the packet contains the match information of the flow entry, the processing action indicated by the flow entry may be performed on the packet, for example, to insert an NSH header into the packet and/or to replace a destination address of the packet with an address of a SF indicated by the flow entry. The network node 220-1 may forward the packet to a downstream node (for example, the network node 220-2) communicatively coupled with the SF based on such a destination address.

The network node 220-2 may be configured with a forwarding rule related to SFP forwarding, such as the flow entry indicating information as shown in FIG. 4B. The network node 220-2 may determine how to forward the packet based on such a flow entry. Specifically, if the network node 220-2 determines that the header of the packet contains match information of the flow entry (such as the identifier of the SFC), the processing action indicated by the flow entry may be performed on the packet, for example, to remove the NSH header from the packet, and/or to replace the destination address of the packet with an address of the SF indicated by the flow entry. The network node 220-2 may forward the packet to a downstream node communicatively coupled with the SF based on such a destination address.

Since the network node 220-2 is connected (i.e., communicatively coupled) with the SF 240-1 and the SF 240-1 is included in the SFC of the packet, the network node 220-2 may further be configured with another forwarding rule which indicates forwarding of the packet to the SF 240-1 for processing. Such a rule may also be configured by the SFC controller 210 as a flow entry in the flow table of the network node 220-2.

Figure 6:
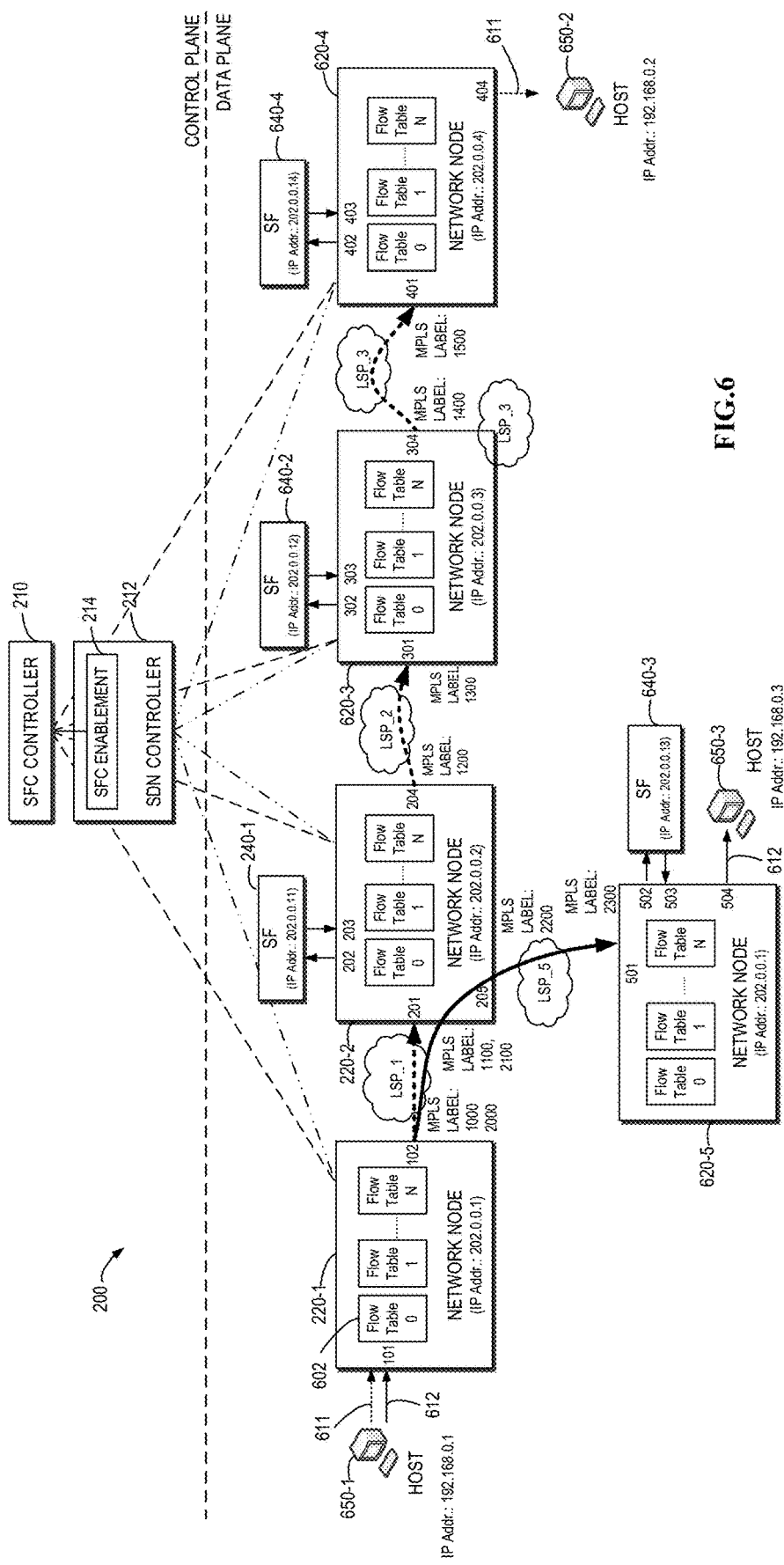
FIG. 6 illustrates an example of an SDN-based SFC system according to an embodiment of the present disclosure.

Hereinafter, a specific example of the system 200 for SFC enablement based on the SDN will be described with reference to FIG. 6, to specifically discuss how the network nodes implement the forwarding of the packets to each SF of the SFC. In the example of FIG. 6, for the purpose of illustration, in addition to the network nodes 220-1, 220-2, the system 200 includes further network nodes 620-3, 620-4 and 620-5 that are connected to SF 640-2, SF 640-2, and 640-3, respectively. The functions of the network nodes 620-3, 620-4 and 620-5 are similar to those of the network nodes 220, and the forwarding rules may also be obtained from the SFC controller 210 to perform forwarding of packets to the SFs. In the example of FIG. 6, the forwarding rules associated with the SFC and configured by the SFC controller 210 are implemented as flow entries in respective flow tables 602 in the network nodes. Each network node may include a plurality of flow tables, and the pipeline processing of the flow tables is needed to perform the forwarding of the packets.

FIG. 6 illustrates an SFC provided for a packet 611 from a host 650-1 to a host 650-2, which involves the SF 240-1, SF 640-2, and SF 640-4. FIG. 6 further illustrates an SFC provided for a packet 612 from the host 650-1 to a host 650-3, which involves the SF 640-3. In the example of FIG. 6, the SDN controller 212 maps a SFC to a MPLS path(s) among the network nodes. A path of the SFC involving the SF 240-1, SF 640-2 and SF 640-4 is mapped to LSP_1, LSP_2, and LSP_3. A path of the SFC involving the SF 640-3 is mapped to LSP_5.

In operation, the network nodes 220-1 and 220-2 and the network nodes 620-3, 620-4 and 620-5 perform packet forwarding according to the flow tables configured therein. FIGS. 7A to 7N illustrate examples of flow tables used by these network nodes during the forwarding. It will be described in detail how the network nodes forward the packets accordingly.

The network node 220-1 receives the packet 611 from the host 650-1, for example, via, an ingress port 101. The network node 220-1 performs an operation related to classification of the SFC based on the flow table 710. Specifically, the network node 220-1 extracts a header from the packet, which includes, for example, a source IP address, a destination IP address, a protocol type, an ingress port of the packet, and the like. The network node 220-1 matches the extracted information with the match fields in the flow entry of the flow table 710 shown in FIG. 7A. If the information extracted from the packet 611 matches the information in a first flow entry in the flow table 710 (for example, the source IP address "192.168.0.1," the destination IP address "192.168.0.2," the protocol type "IPv4," and Ingress Port 101), the network node 220-1 determines that the flow entry matches the packet 611. Then, the network node 220-1 performs a processing action on the packet 611 based on the flow entry. Specifically, the network node 220-1 determines that the processing action indicated by the flow entry is "Push NSH Header," so the NSH indicated by the flow entry is inserted into the packet 611. In addition, the network node 220-1 further replaces the destination IP address in the header of the packet with the destination IP address of a next hop indicated by the flow entry (i.e., the IP address of SF 240-1 "202.0.0.11"), and continues to process the packet 611 with reference to the flow table 12 according to the pipeline processing of the flow tables.

In some embodiments, if the network node 220-1 does not find a flow entry that matches the packet 611 in the flow table 710, the network node 220-1 cannot forward the packet. In this case, the network node 220-1 may transmit the packet 611 directly to the SFC controller 210 according to the NETCONF protocol or forward the packet 611 to the SFC controller 210 via the SDN controller 212. In response to receiving such a packet, the SFC controller 210 may create an SFC of the packet and configure a flow entry of a flow table associated with the created SFC to the network node 220-1.

For the packet 612 received from the host 650-1, the network node 220-1 may similarly perform an operation about the classification of the SFC based on the flow table 710, and determine that a second flow entry in the flow table 710 matches the packet 612. According to this flow entry, the network node 220-1 inserts a NSH header into the packet 612, and modifies the destination IP address of the packet 612 to the destination IP address of a next hop indicated by the matched flow entry (i.e., the IP address of SF 640-3 "202.0.0.13"), and continues to process the packet 612 with reference to the flow table 12 according to the pipeline processing of the flow tables. If the network node 220-1 is not originally configured with the flow entry that matches the packet 612, the network node 220-1 may also provide the packet 612 to the SFC controller 210 to obtain the correct flow entry from the SFC controller 210.

In the pipeline processing of the flow tables, the network node 220-1 continues to process the packets 611 and 612 with reference to Flow Table 12. FIG. 7B illustrates an example structure 712 of Flow Table 12 in the network node 220-1. For the packet 611, the network node 220-1 matches the information extracted from the header of the packet 611 (for example, the ingress port 101, the destination IP address "202.0.0.11") with a flow entry of the flow table 712. If a matched flow entry (e.g., the first flow entry) is found from the flow table 712, the network node 220-1 sets an egress label ("MPLS Label 1000") of the packet based on the flow entry, updates the packet header of the packet 611 (i.e., by pushing "MPLS Label 1000"), and forwards the packet via Egress Port 102.

For the packet 612, the network node 220-1 matches the information extracted from the header of the packet 612 (for example, Ingress Port 101, the destination IP address "202.0.0.13") with a flow entry of the flow table 712. If a matched flow entry (e.g., the second flow entry) is found from the flow table 712, the network node 220-1 sets an egress label ("MPLS Label 2000") of the packet based on the flow entry, and updates the packet header of the packet 612 (i.e., by pushing "MPLS Label 2000"), and forwards the packet via Egress Port 102.

After the processing, the packets 611 and 612 are output by the egress port 102 of the network node 220-1, and input to the network node 220-2 via its ingress port 201. The network node 220-2 first performs forwarding of the packets 611 and 612 based on a flow table 720 as shown in FIG. 7C. Specifically, in the network node 220-2, for the packet 611 received from the upstream node 220-1, the network node 220-2 extracts the header of the packet 611 (which indicates, for example, Ingress Port 201, ingress MPLS Label 1100, the destination IP Address, the NSH header inserted by network node 220-1, and the like). The network node 220-2 matches the extracted information with the flow entry of the flow table 720, and determines that it matches the first flow entry (including the ingress port 201 and the ingress MPLS Label 1100) in the flow table 720. The network node 220-2 may perform the processing action on the packet 611 based on the flow entry. The network node 220-2 may update the packet header of the packet 611 to remove MPLS Label 1100, and output the packet 611 via the egress port 202.

The network node 220-2 is communicatively coupled to the SF 240-1 via the egress port 202. Therefore, the SF 240-1 may receive the packet 611 and perform corresponding processing on the packet 611. In some examples, the SF 240-1 processes the packet 611 by using a context header (e.g., C1) in the NSH header of the packet 611 and reduces the identifier "SI" in the NSH header of the packet 611 (e.g., from 255 to 254). After the processing, the SF 240-1 returns the packet 611 to the network node 220-2 via Ingress Port 203 of the network node 220-2. After receiving the packet 611, the network node 220-2 extracts the header of the packet 611 (for example, the ingress port, the ingress MPLS label, the SPI and SI in the NSH). The network node 220-2 determines that the packet 611 matches a third flow entry in the flow table 720 (which indicates Ingress Port 203). According to the flow entry, the network node 220-2 may continue to process the packet 611 with reference to Flow Table 1 in this node.

For the packet 612 received from the upstream node 220-1 via Ingress Port 201, the network node 220-2 may also similarly process this packet with reference to the flow table 720, to determine the flow entry that matches the packet (for example, the second flow entry in the flow table 720) and perform the processing action indicated by the matched flow entry on the packet 612. Specifically, the network node 220-2 updates the header of the packet 612, i.e., changes the MPLS label in the header from MPLS Label 2100 to MPLS Label 2200, and outputs the packet 612 via Egress Port 205.

For the packet 611, as mentioned above, the network node 220-2 may need to continue the processing with reference to Flow Table 1. FIG. 7D illustrates an example of Flow Table 1 in the network node 220-2, namely, the flow table 722. The flow table 722 includes a flow entry associated with SFP forwarding. The network node 220-2 matches the information extracted from the header of the packet 611 with the information in the match fields of the flow entries of the flow table 722, and determines that the flow entry indicating SPI "25" and SI "254" matches the information contained in the NSH header of the packet 611. The network node 220-2 then determines an IP address of a next hop for the packet 611 (i.e., the IP address "202.0.0.12" of the SF 640-2). The network node 220-2 further performs the processing action indicated by the flow entry on the packet 611, that is, replaces the destination address in the header of the packet 611 with the IP address of the next hop, and then continues to process the packet 611 with reference to Flow Table 23 according to the pipeline processing of the flow tables.

Flow Table 23 of the network node 220-2 is shown as a flow table 724 in FIG. 7E. The network node 220-2 matches the information extracted from the header of the packet 611 with the information indicated in the match fields in the flow entries of the flow table 724, and determines the flow entry indicating Ingress Port 203 and the destination IP address "202.0.0.12 611" matches the information in the header of the packet 611. The network node 220-2 may thus process the packet 611 based on the flow entry. Specifically, the network node 220-2 sets the egress MPLS label of the packet 611 to "Egress Label 1200" as indicated by the flow entry, updates the header by inserting "MPLS Label 1200" into the header of the packet 611, and then outputs this packet via Egress Port 204.

Ingress Port 301 of the network node 620-3 is connected to Egress Port 204 of the network node 220-2, so the network node 620-3 receives the packet 611. The network node 620-3 may process the packet 611 based on the flow table configured therein. Specifically, the network node 620-3 first looks up a flow table 730 shown in FIG. 7F for a flow entry matching the packet 611. The network node 620-3 extracts the header information of the packet 611 (for example, Ingress Port 301, ingress MPLS Label 1300, an NSH header, a destination IP address, and the like), and then determines that the extracted information matches the information in the match fields of the first flow entry in the flow table 730 (which indicates Ingress Port 301 and ingress MPLS Label 1300). Thus, the network node 620-3 performs corresponding processing on the packet 611 based on the flow entry, for example, by extracting MPLS Label 1300 from the header of the packet 611, and outputting the packet 611 via Egress Port 302.

The network node 620-3 is communicatively coupled to the SF 640-2 via its Egress Port 302. Therefore, the SF 640-2 may receive the packet 611 and perform corresponding processing on the packet 611. In some examples, the SF 640-2 processes the packet 611 by using a context header (e.g., C1) in the NSH header of the packet 611 and reduces the identifier SI in the NSH header of packet 611 (e.g., from 254 to 253). After the processing, the SF 640-2 returns the packet 611 to the network node 620-3 via its Ingress Port 303. After receiving the packet 611, the network node 620-3 extracts the header of the packet 611 (for example, the ingress port, the ingress MPLS label, the SPI and SI in the NSH). The network node 620-3 determines that the packet 611 matches the third flow entry of the flow table 730 (which indicates Ingress Port 303). According to this flow entry, the network node 620-3 may continue to process the packet 611 with reference to Flow Table 1 in this node.

FIG. 7G illustrates an example of flow Table 1, i.e., a flow table 732 in the network node 620-3. The flow table 732 includes a flow entry associated with SFP forwarding. The network node 620-3 matches the information extracted from the header of the packet 611 with the information in the match fields of the flow entries of the flow table 732, and determines that the flow entry indicating SPI "25" and SI "253" matches the information contained in the NSH header of the packet 611. According to the matched flow entry, the network node 620-3 determines an IP address of a next hop for the packet 611 (i.e., the IP address "202.0.0.14" of the SF 640-4). The network node 620-3 further performs the processing action indicated by the flow entry on the packet 611, that is, replaces the destination address in the header of the packet 611 with the IP address of the next hop, and then continues to process the packet 611 with reference to Flow Table 34 according to the pipeline processing of the flow tables.

Flow Table 34 of the network node 620-3 is shown as a flow table 734 in FIG. 7H. The network node 620-3 matches the information extracted from the header of the packet 611 with the information indicated in the match fields in the flow entries of the flow table 734, and determines the flow entry indicating the ingress port 303 and the destination IP address 202.0.0.14 611 matches the information in the header of the packet 611. The network node 620-3 may thus process the packet 611 based on the flow entry. Specifically, the network node 620-3 sets the egress MPLS label of the packet 611 to "Egress Label 1400" as indicated by the flow entry, updates the header by inserting "MPLS Label 1400" into the header of the packet 611, and then outputs the packet via Egress Port 304.

Ingress Port 401 of the network node 620-4 is connected to Egress Port 304 of the network node 620-3, so the network node 620-4 receives the packet 611. The network node 620-4 may process the packet 611 based on the flow table configured therein. Specifically, the network node 620-4 first looks up a flow table 740 shown in FIG. 7I for a flow entry matching the packet 611. The network node 620-4 extracts the header information of the packet 611 (for example, Ingress Port 401, ingress MPLS Label 1500, an NSH header, a destination IP address, and the like), and then determines that the extracted information matches the information in the match fields of the first flow entry in the flow table 740 (which indicates Ingress Port 401 and ingress MPLS Label 1500). Then, the network node 620-4 performs corresponding processing on the packet 611 based on the flow entry, for example, by extracting MPLS Label 1500 from the header of the packet 611, and outputting the packet 611 via Port 402.

The network node 620-4 is communicatively coupled to the SF 640-4 via its Egress Port 402, so the SF 640-4 may receive the packet 611 and perform corresponding processing on the packet 611. In some examples, the SF 640-4 processes the packet 611 by using a context header in the NSH header of the packet 611 (e.g., C1) and reduces the identifier SI in the NSH header of the packet 611 (e.g., from 253 to 252). After the processing, the packet 611 is returned to the network node 620-4 via Ingress Port 403 of the SF 640-4. After receiving the packet 611, the network node 620-4 determines that the information of the header (for example, an ingress port, an ingress MPLS label, the SPI and SI in the NSH) matches Ingress Port 403 as indicated in the flow table 740. According to this flow entry, the network node 620-4 may continue to process the packet 611 with reference to flow Table 1 (i.e., the flow table 742 shown in FIG. 7J).

According to the flow table 742, the network node 620-4 matches the information extracted from the header of the packet 611 with the information in the match fields of the flow entries of the flow table 742, and determines the flow entry indicating SPI "25" and SI "252" matches the information contained in the NSH header of the packet 611. According to the matched flow entry, the network node 620-4 determines an IP address of a next hop for the packet 611 (i.e., the IP address "192.168.0.2" of the host 650-2). The network node 620-4 further performs the processing actions indicated by the flow entry on the packet 611, that is, removes the NSH header of the packet 611 and replaces the destination address in the header of the packet 611 with the IP address of the next hop, and then continues to process the packet 611 with reference to Flow Table 45 according to the pipeline processing of the flow tables.

The flow table 45 of the network node 620-4 is shown as a flow table 744 in FIG. 7K. The network node 620-4 matches the information extracted from the header of the packet 611 with the information indicated in the match fields in the flow entries of the flow table 744, and determines that the flow entry indicating Ingress Port 403 and the destination IP address "192.168.0.2 611" matches the information in the header of the packet 611. The network node 620-4 may thus process the packet 611 based on the flow entry. Specifically, the network node 620-4 outputs the packet 611 via Egress Port 404. The host 650-2 is connected to Egress Port 404 of the network node 620-4 and thus may obtain the packet 611.

The processing of the packet 612 is also considered. As described above, the packet 612 is output via Egress Port 205 of the network node 220-1. Ingress Port 501 of the network node 620-5 is connected to Egress Port 205 of the network node 220-1, so the network node 620-5 obtains the packet 612. The network node 620-5 may process the packet 612 based on the flow table configured therein. Specifically, the network node 620-5 looks up a flow table 750 shown in FIG. 7L for a flow entry matching the packet 612. The network node 620-5 extracts the header information of the packet 612 (for example, Ingress Port 501, ingress MPLS label 2300, an NSH header, a destination IP address, and the like), and then determines that the extracted information matches the information in the match fields of the first flow entry in the flow table 750 (which indicates Ingress Port 501 and ingress MPLS Label 2300). Thus, the network node 620-5 performs corresponding processing on the packet 612 based on the flow entry, for example, by extracting MPLS Label 2300 from the header of the packet 612 and outputting the packet 612 via Egress Port 502.

The network node 620-5 is communicatively coupled to the SF 640-3 via Egress Port 502. Thus, the SF 640-3 may receive the packet 612 and perform corresponding processing on the packet 612. In some examples, the SF 640-3 processes the packet 612 by using a context header (e.g., C2) in the NSH header of the packet 612 and reduces the identifier SI in the NSH header of the packet 612 (e.g., from 224 to 223). After the processing, the SF 640-3 returns the packet 612 to the network node 620-5 via its Ingress Port 502. After receiving the packet 612, the network node 620-5 extracts the header of the packet 612 (for example, an ingress port, an ingress MPLS label, and the SPI and SI in the NSH). The network node 620-5 determines that the packet 612 matches the second flow entry (which indicates the ingress port 503) of the flow table 750. According to the flow entry, the network node 620-5 will continue to process the packet 612 with reference to Flow Table 1 in this node.

FIG. 7M illustrates an example of Flow Table 1, i.e., a flow table 752 in the network node 620-5. The network node 620-5 matches the information extracted from the header of the packet 612 with the information in the match fields of the flow entries of the flow table 752, and determines that the flow entry indicating SPI "135" and SI "223" matches the information contained in the NSH header of the packet 612. According to the matched flow entry, the network node 620-3 determines an IP address of a next hop for the packet 611 (i.e., the IP address "192.168.0.3" of the host 650-3). The network node 620-5 further performs the processing action indicated by the flow entry on the packet 612, that is, removes the NSH header of the packet 612 and replaces the destination address in the header of the packet 612 with the IP address of the next hop, and then continues to process the packet 612 with reference to Flow Table 56 according to the pipeline processing of the flow tables.

Flow Table 56 of the network node 620-5 is shown as a flow table 754 in FIG. 7N. The network node 620-5 matches the information extracted from the header of the packet 612 with the information indicated in the match fields in the flow entries of the flow table 754, and determines the flow entry indicating Ingress Port 503 and the destination IP address "192.168.0.3 612" matches the information in the header of the packet 612. The network node 620-5 may thus process the packet 612 based on the flow entry. Specifically, the network node 620-5 outputs the packet 612 via Egress Port 504. The host 650-3 is connected to Egress Port 504 of the network node 620-5 and thus may obtain the packet 612.

After the above process, the packets 611 and 612 may be processed via the SFs in their respective SFCs before transmitted to the destination host. According to the embodiments of the present disclosure, it is possible to enable SFCs in a SDN network.

Figure 8:
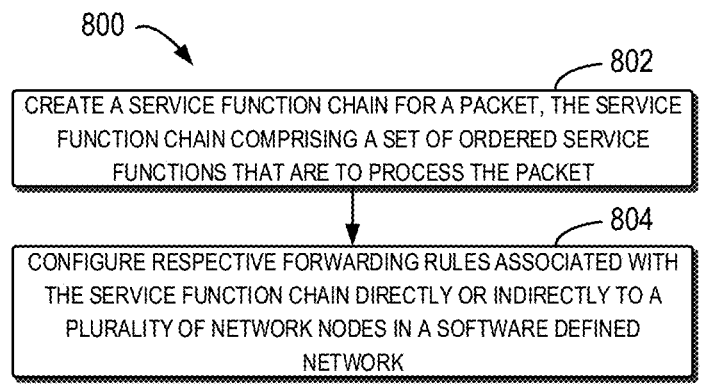
FIG. 8 illustrates a flowchart of a method implemented at an SFC controller according to an embodiment of the present disclosure.

FIG. 8 illustrates a flowchart of a method 800 for communication according to an embodiment of the present disclosure. The method 800 may be implemented at, for example, the SFC controller 210 shown in FIG. 2.

At block 802, a service function chain is created for a packet, the service function chain comprising a set of ordered service functions that are to process the packet. At block 804, respective forwarding rules associated with the service function chain are configured to a plurality of network nodes in a software defined network. The respective forwarding rules indicates how the plurality of network nodes forward the packet to the set of ordered service functions in the service function chain.

In some embodiments, configuring the respective forwarding rules to the plurality of network nodes comprises one of: transmitting the respective forwarding rules to the plurality of network nodes directly; or providing the respective forwarding rules to the plurality of network nodes via a software defined network controller in the software defined network.

In some embodiments, configuring the respective forwarding rules to the plurality of network nodes comprises: configuring a first flow entry to a first flow table of a first network node, the first flow entry indicating at least match information, a network service header of the packet, a first service function of the set of ordered service functions to which the packet is forwarded, and a first processing action to be performed by the first network node on the packet, the first processing action comprising at least one of insertion of the network service header and replacement of a destination address of the packet with an address of the first service function.

In some embodiments, the network service header comprises at least one of the follows: an identifier of the service function chain, a protocol type of a payload in the packet, and a context header.

In some embodiments, the match information comprises at least one of the follows: a source address, a source port number, a destination address, a destination port number, a protocol type, an ingress port number, an application type, and user information of the packet.

In some embodiments, configuring the respective forwarding rules to the plurality of network nodes comprises: configuring a second flow entry to a second flow table of a second network node, the second flow entry indicating at least an identifier of the service function chain, a second service function of the set of ordered service functions to which the packet is forwarded, and a second processing action to be performed by the second network node on the packet, the second processing action comprising at least one of removal of a network service header from the packet and replacement of a destination address of the packet with an address of the second service function.

In some embodiments, creating the service function chain comprises: transmitting, to a software defined network controller of the software defined network, a request for topology information about the software defined network; receiving the topology information from the software defined network controller; and generating the service function chain based on the topology information.

In some embodiments, creating the service function chain comprises: creating the service function chain for the packet in response to receiving, from a network node of the plurality of network nodes, an indication that the packet fails to be forwarded in absence of a matched service function chain.

Figure 9:
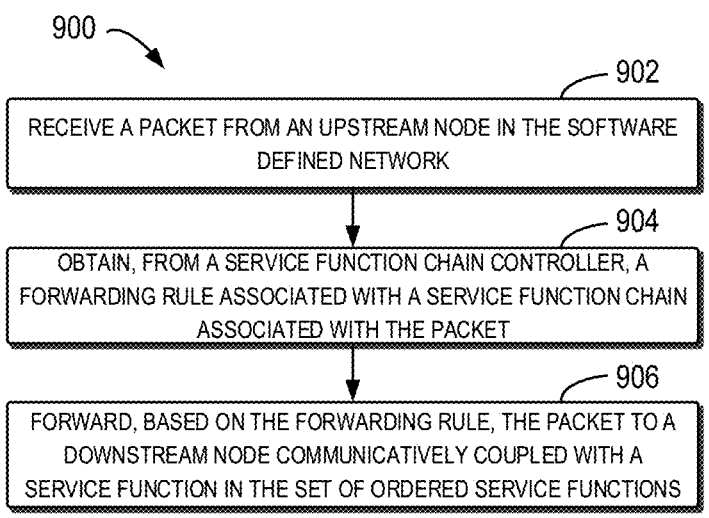
FIG. 9 illustrates a flowchart of a method implemented at a network node in an SDN network according to an embodiment of the present disclosure.

FIG. 9 illustrates a flowchart of a method 900 for communication according to an embodiment of the present disclosure. The method 900 may be implemented at, for example, a network node 220 shown in FIG. 2 or a network node 620-3, 620-4, or 620-5 shown in FIG. 6.

At block 902, a packet is received from an upstream node in the software defined network. At block 904, a forwarding rule associated with a service function chain associated with the packet is obtained from a service function chain controller. The service function chain comprises a set of ordered service functions that are to process the packet, and the forwarding rule indicates how the network node forwards the packet to a service function in the set of ordered service functions. At block 906, the packet is forwarded, based on the forwarding rule, to a downstream node communicatively coupled with a service function in the set of ordered service functions.

In some embodiments, obtaining the forwarding rule comprises one of: directly receiving the forwarding rule from the service function chain controller; or receiving the forwarding rule forwarded from the service function chain controller via a software defined network controller in the software defined network.

In some embodiments, the forwarding rule comprises a first flow entry in a first flow table, the first flow entry indicating at least match information, a network service header of the packet, a first service function of the set of ordered service functions to which the packet is forwarded, and a first processing action to be performed by the network node on the packet, the first processing action comprising at least one of insertion of the network service header into the packet and replacement of a destination address of the packet with an address of the first service function. Forwarding the packet comprises: in response to a determination that a header of the packet comprises the match information, performing the first processing action on the packet, and forwarding the packet to the downstream node communicatively coupled with the first service function based on the address of the first service function.

In some embodiments, the network service header comprises at least one of the follows: an identifier of the service function chain, a protocol type of a payload in the packet, and a context header.

In some embodiments, the match information comprises at least one of the follows: a source address, a source port number, a destination address, a destination port number, a protocol type, an ingress port number, an application type, and user information of the packet.

In some embodiments, the forwarding rule comprises a second flow entry in a second flow table, the second flow entry indicating at least an identifier of the service function chain, a second service function of the set of ordered service functions to which the packet is forwarded, and a second processing action to be performed by the network node on the packet, the second processing action comprising at least one of removal of a network service header from the packet and replacement of a destination address of the packet with an address of the second service function. Forwarding the packet comprises: in response to a determination that a header of the packet comprises an identifier of the service function chain in the second flow entry, performing the second processing action on the packet, and forwarding the packet to the downstream node communicatively coupled with the second service function based on the address of the second service function.

In some embodiments, obtaining the forwarding rule comprises: in response to a determination, upon reception of the packet, that the packet fails to be forwarded in absence of a matched service function chain, providing, to the service function chain controller, an indication that the packet fails to be forwarded by the network node; and obtaining the forwarding rule from the service function chain controller.

Figure 10:
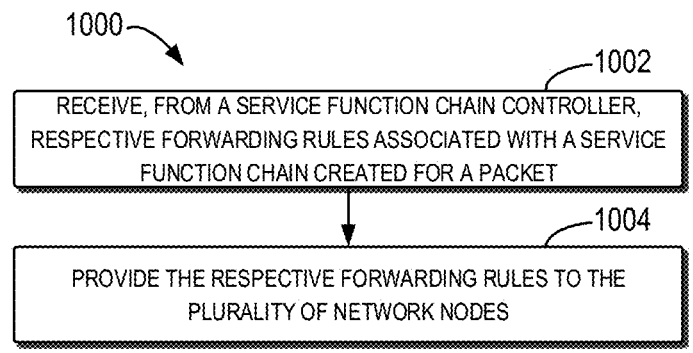
FIG. 10 illustrates a flowchart of a method implemented at an SDN controller according to an embodiment of the present disclosure.

FIG. 10 illustrates a flowchart of a method 1000 for communication according to an embodiment of the present disclosure. The method 1000 may be, for example, at the SDN controller shown in FIG. 2.

At block 1002, respective forwarding rules associated with a service function chain created for a packet are received from a service function chain controller. The service function chain comprises a set of ordered service functions that are to process the packet, and the respective forwarding rules indicate how a plurality of network nodes in a software defined network forward the packet to the set of ordered service functions in the service function chain. At block 1004, the respective forwarding rules are provided to the plurality of network nodes.

In some embodiments, the method 1000 further comprises: receiving, from the service function chain controller, a request for topology information about the software defined network; and in response to the request, providing the topology information to the service function chain controller.

In some embodiments, the method 1000 further comprises: receiving, from a network node of the plurality of network nodes, an indication that the packet fails to be forwarded by the network node; and providing the indication to the service function chain controller.

In some embodiments, the method 1000 further comprises: mapping a path of the service function chain to a multi-protocol label switching path in the software defined network for transmission of the packet in the software defined network.

In some embodiments, if the packet is interested with a network service header, presence of the network service header of the packet is indicated in a label for the multi-protocol label switching path.

Some embodiments of the present disclosure further provide a communication apparatus. The communication apparatus comprises: means for creating a service function chain for a packet, the service function chain comprising a set of ordered service functions that are to process the packet; and means for configuring respective forwarding rules associated with the service function chain to a plurality of network nodes in a software defined network, the respective forwarding rules indicating how the plurality of network nodes forward the packet to the set of ordered service functions in the service function chain.

In some embodiments, the communication apparatus may include a service function chain controller.

In some embodiments, the means for configuring the respective forwarding rules to the plurality of network nodes comprises one of: means for directly transmitting the respective forwarding rules to the plurality of network nodes; or means for providing the respective forwarding rules to the plurality of network nodes via a software defined network controller in the software defined network.

In some embodiments, the means for configuring the respective forwarding rules to the plurality of network nodes comprises: means for configuring a first flow entry to a first flow table of a first network node, the first flow entry indicating at least match information, a network service header of the packet, a first service function of the set of ordered service functions to which the packet is forwarded, and a first processing action to be performed by the first network node on the packet, the first processing action comprising at least one of insertion of the network service header and replacement of a destination address of the packet with an address of the first service function.

In some embodiments, the network service header comprises at least one of the follows: an identifier of the service function chain, a protocol type of a payload in the packet, and a context header.

In some embodiments, the match information comprises at least one of the follows: a source address, a source port number, a destination address, a destination port number, a protocol type, an ingress port number, an application type, and user information of the packet.

In some embodiments, the means for configuring the respective forwarding rules to the plurality of network nodes comprises: means for configuring a second flow entry to a second flow table of a second network node, the second flow entry indicating at least an identifier of the service function chain, a second service function of the set of ordered service functions to which the packet is forwarded, and a second processing action to be performed by the second network node on the packet, the second processing action comprising at least one of removal of a network service header from the packet and replacement of a destination address of the packet with an address of the second service function.

In some embodiments, the means for creating the service function chain comprises: means for transmitting, to a software defined network controller of the software defined network, a request for topology information about the software defined network; means for receiving the topology information from the software defined network controller; and means for generating the service function chain based on the topology information.

In some embodiments, the means for creating the service function chain comprises: means for creating the service function chain for the packet in response to receiving, from a network node of the plurality of network nodes, an indication that the packet fails to be forwarded in absence of a matched service function chain.

Some other embodiments of the present disclosure further provide a communication apparatus. The communication apparatus comprises: means for receiving a packet from an upstream node in the software defined network; means for obtaining, from a service function chain controller, a forwarding rule associated with a service function chain associated with the packet, the service function chain comprising a set of ordered service functions that are to process the packet, and the forwarding rule indicating how the network node forwards the packet to a service function in the set of ordered service functions; and means for forwarding, based on the forwarding rule, the packet to a downstream node communicatively coupled with a service function in the set of ordered service functions.

In some embodiments, the communication apparatus comprises a network node in the software defined network.

In some embodiments, the means for obtaining the forwarding rule comprises one of: means for directly receiving the forwarding rule from the service function chain controller; or means for receiving the forwarding rule forwarded from the service function chain controller via a software defined network controller in the software defined network.

In some embodiments, the forwarding rule comprises a first flow entry in a first flow table, the first flow entry indicating at least match information, a network service header of the packet, a first service function of the set of ordered service functions to which the packet is forwarded, and a first processing action to be performed by the network node on the packet, the first processing action comprising at least one of insertion of the network service header into the packet and replacement of a destination address of the packet with an address of the first service function. In some implementations, the means for forwarding the packet comprises: means for performing, in response to a determination that a header of the packet comprises the match information, the first processing action on the packet; and means for forwarding the packet to the downstream node communicatively coupled with the first service function based on the address of the first service function.

In some embodiments, the network service header comprises at least one of the follows: an identifier of the service function chain, a protocol type of a payload in the packet, and a context header.

In some embodiments, the match information comprises at least one of the follows: a source address, a source port number, a destination address, a destination port number, a protocol type, an ingress port number, an application type, and user information of the packet.

In some embodiments, the forwarding rule comprises a second flow entry in a second flow table, the second flow entry indicating at least an identifier of the service function chain, a second service function of the set of ordered service functions to which the packet is forwarded, and a second processing action to be performed by the network node on the packet, the second processing action comprising at least one of removal of a network service header from the packet and replacement of a destination address of the packet with an address of the second service function. In some implementations, the means for forwarding the packet comprises: means for, in response to a determination that a header of the packet comprises an identifier of the service function chain in the second flow entry, performing the second processing action on the packet, and means for forwarding the packet to the downstream node communicatively coupled with the second service function based on the address of the second service function.

In some embodiments, the means for obtaining the forwarding rule comprises: means for, in response to a determination, upon reception of the packet, that the packet fails to be forwarded in absence of a matched service function chain, providing, to the service function chain controller, an indication that the packet fails to be forwarded by the network node; and means for obtaining the forwarding rule from the service function chain controller.

Some other embodiments of the present disclosure further provide a communication apparatus. The communication apparatus comprises: means for receiving, from a service function chain controller, respective forwarding rules associated with a service function chain created for a packet, the service function chain comprising a set of ordered service functions that are to process the packet, the respective forwarding rules indicating how a plurality of network nodes in a software defined network forward the packet to the set of ordered service functions in the service function chain; and means for providing the respective forwarding rules to the plurality of network nodes.

In some embodiments, the communication apparatus comprises a software defined network controller.

In some embodiments, the communication apparatus further comprises: means for receiving, from the service function chain controller, a request for topology information about the software defined network; and means for, in response to the request, providing the topology information to the service function chain controller.

In some embodiments, the communication apparatus further comprises: means for receiving, from a network node of the plurality of network nodes, an indication that the packet fails to be forwarded by the network node; and means for providing the indication to the service function chain controller.

In some embodiments, the communication apparatus further comprises: means for mapping a path of the service function chain to a multi-protocol label switching path in the software defined network for transmission of the packet in the software defined network.

In some embodiments, if the packet is interested with a network service header, presence of the network service header of the packet is indicated in a label for the multi-protocol label switching path.

Figure 11:
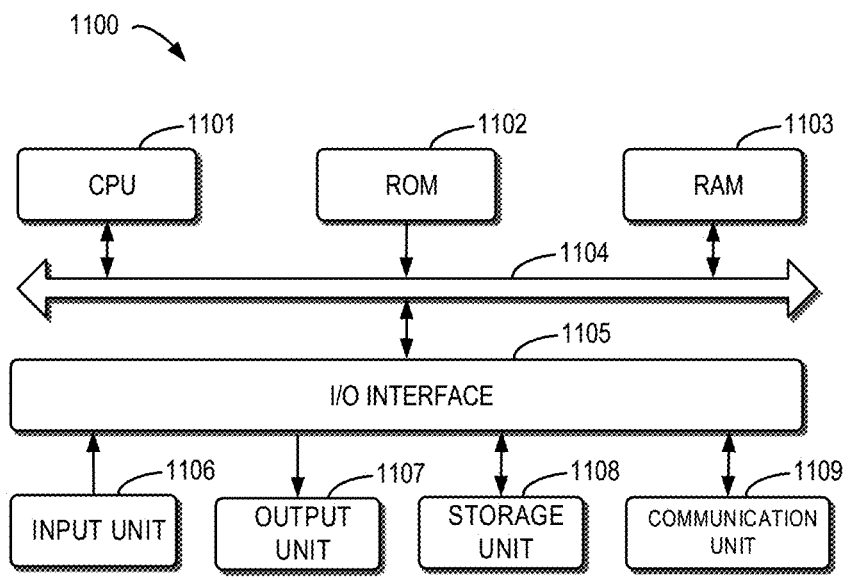
FIG. 11 illustrates a schematic block diagram of an example apparatus that may be used to implement an embodiment of the present disclosure.

FIG. 11 is a block diagram illustrating an example device 1100 that can be used to implement embodiments of the present disclosure. As shown, the device 1100 includes a central processing unit (CPU) 1101 which performs various suitable acts and processing based on computer program instructions stored in a read-only memory (ROM) 1102 or computer program instructions loaded from a storage unit 1108 to a random access memory (RAM) 1103. The RAM 1103 stores therein various programs and data required for operations of the device 1100. The CPU 1101, the ROM 1102, and the RAM 1103 are connected via a bus 1104 with one another. An input/output (I/O) interface 1105 is also connected to the bus 1104.

The following components in the device 1100 are connected to the I/O interface 1105: an input unit 1106 such as a keyboard, a mouse and the like; an output unit 1107 including various kinds of displays and a loudspeaker, and the like; a storage unit 1108 including a magnetic disk, an optical disk, and the like; a communication unit 1109 including a network card, a modem, and a wireless communication transceiver, and the like The communication unit 1109 enables the device 1100 to exchange information/data with other devices through a computer network such as the Internet and/or various telecommunications networks.

Various processes and processing described above, e.g., the method 800, the method 900, and/or the method 1000 may be executed by the processing unit 1101. For example, in some embodiments, the method 800, the method 900 and/or the method 1000 may be implemented as a computer software program that is tangibly included in a machine readable medium, e.g., the storage unit 1108. In some embodiments, part or all of the computer program may be loaded and/or mounted onto the device 1100 via ROM 1102 and/or communication unit 1109. When the computer program is loaded to the RAM 1103 and executed by the CPU 1101, one or more steps of the method 800, the method 900 and/or the method 1000 as described above may be executed.

The present disclosure may be methods, devices, systems, and/or computer program products. A computer program product may include a computer readable storage medium having computer readable program instructions thereon for carrying out various aspects of the present disclosure.

The computer readable storage medium may be a tangible device that can retain and store instructions for use by an instruction execution device. The computer readable storage medium may include, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer disk, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as transitory signals per se, such as radio waves or other freely propagating electromagnetic waves, electromagnetic waves propagating through a waveguide or other transmission media (e.g., light pulses passing through a fiber-optic cable), or electrical signals sent through a wire.

Computer readable program instructions described herein can be downloaded to respective computing/processing devices from a computer readable storage medium or to an external computer or external storage device via a network, for example, the Internet, a local area network, a wide area network, and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assemble instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter case, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA), may execute the computer readable program instructions by utilizing state information of the computer readable program instructions to customize the electronic circuitry, so as to perform various aspects of the present disclosure.

Various aspects of the present disclosure are described herein with reference to flowcharts and/or block diagrams of the methods, device (systems), and computer program products according to the embodiments of the disclosure. It will be understood that each block of the flowcharts and/or block diagrams, and combinations of blocks in the flowcharts and/or block diagrams, can be implemented by computer readable program instructions.

These computer readable program instructions may be provided to a processing unit of a general purpose computer, special purpose computer, or other programmable data processing device to produce such a machine that the instructions, when executed via the processing unit of the computer or other programmable data processing device, generate means for implementing the functions/acts specified in blocks of the flowcharts and/or block diagrams. These computer readable program instructions may also be stored in a computer readable storage medium that can instruct a computer, a programmable data processing device, and/or other devices to function in a particular manner such that the computer readable storage medium having instructions stored therein includes an article of manufacture which includes instructions for implementing various aspects of the functions/acts specified in one or more blocks of the flowcharts and/or block diagrams.

The computer readable program instructions may also be loaded onto a computer, other programmable data processing device, or other devices to cause a sequence of operation steps to be performed on the computer, other programmable devices, or other device to produce a computer implemented process, such that the instructions, when are executed on the computer, other programmable device, or other devices implement the functions/acts specified in one or more blocks of the flowcharts and/or block diagrams.

The flowcharts and block diagrams illustrate the architecture, functionality, and operation of possible implementations of the systems, methods and computer program products according to various embodiments of the present disclosure. In this regard, each block in the flowcharts or block diagrams may represent a module, snippet, or portion of code, which includes one or more executable instructions for implementing the specified logical function(s). In some implementations, as an alternative, the functions illustrated in the blocks may be carried out in a different order than the one illustrated in the figures. For example, two sequential blocks may, in fact, be executed substantially concurrently, or may sometimes be executed in a reversed order, depending on the functionalities involved therein. It will also be noted that each block of the block diagrams and/or flowcharts, and a combination of the blocks in the block diagrams and/or flowcharts, can be implemented by a special purpose hardware-based system that performs the specified function or act, or a combination of special purpose hardware and computer instructions.

The description of the various embodiments of the present disclosure have been presented for the purposes of illustration, but are not intended to be exhaustive or limited to the embodiments disclosed. Various modifications and variations will be apparent to those ordinary skilled in the art without departing from the scope and spirit of the described embodiments. The terminologies used herein are chosen to best explain the principles of the embodiments, the practical applications or technical improvements over technologies found in the marketplace, or to enable others ordinary skilled in the art to understand the embodiments disclosed herein.

What is claimed is:

1. A method implemented at a service function chain controller, comprising:
    creating a service function chain for a packet, the service function chain comprising a set of ordered service functions that are to process the packet;
    configuring respective forwarding rules associated with the service function chain directly or indirectly to a plurality of network nodes in a software defined network, the respective forwarding rules indicating how the plurality of network nodes forward the packet to the set of ordered service functions in the service function chain,
    wherein configuring the respective forwarding rules to the plurality of network nodes directly or indirectly comprises:
    configuring a first flow entry to a first flow table of a first network node directly or indirectly, the first flow entry indicating at least match information, a network service header of the packet, a first service function of the set of ordered service functions to which the packet is forwarded, and a first processing action to be performed by the first network node on the packet, the first processing action comprising at least one of insertion of the network service header and replacement of a destination address of the packet with an address of the first service function.

2. The method of claim 1, wherein configuring the respective forwarding rules to the plurality of network nodes directly or indirectly comprises one of:
    transmitting the respective forwarding rules to the plurality of network nodes directly; or
    providing the respective forwarding rules to the plurality of network nodes via a software defined network controller in the software defined network.

3. The method of claim 1, wherein the network service header comprises at least one of: an identifier of the service function chain, a protocol type of a payload in the packet, and a context header.

4. The method of claim 1, wherein the match information comprises at least one of: a source address, a source port number, a destination address, a destination port number, a protocol type, an ingress port number, an application type, and user information of the packet.

5. The method of claim 1, wherein configuring the respective forwarding rules to the plurality of network nodes directly or indirectly comprises:
    configuring a second flow entry to a second flow table of a second network node directly or indirectly, the second flow entry indicating at least an identifier of the service function chain, a second service function of the set of ordered service functions to which the packet is forwarded, and a second processing action to be performed by the second network node on the packet, the second processing action comprising at least one of removal of a network service header from the packet and replacement of a destination address of the packet with an address of the second service function.

6. The method of claim 1, wherein creating the service function chain comprises:
    transmitting, to a software defined network controller of the software defined network, a request for information about the software defined network;
    receiving the information from the software defined network controller; and
    generating the service function chain based on the information.

7. The method of claim 1, wherein creating the service function chain comprises:
    creating the service function chain for the packet in response to receiving, from a network node of the plurality of network nodes, an indication that the packet fails to be forwarded in absence of a matched service function chain.

8. A method implemented at a network node in a software defined network, comprising:
    receiving a packet from an upstream node in the software defined network;
    obtaining, from a service function chain controller, a forwarding rule associated with a service function chain associated with the packet, the service function chain comprising a set of ordered service functions that are to process the packet, and the forwarding rule indicating how the network node forwards the packet to a service function in the set of ordered service functions; and forwarding, based on the forwarding rule, the packet to a downstream node communicatively coupled with a service function in the set of ordered service functions, wherein the forwarding rule comprises a first flow entry in a first flow table, the first flow entry indicating at least match information, a network service header of the packet, a first service function of the set of ordered service functions to which the packet is forwarded, and a first processing action to be performed by the network node on the packet, the first processing action comprising at least one of insertion of the network service header into the packet and replacement of a destination address of the packet with an address of the first service function.

9. The method of claim 8, wherein obtaining the forwarding rule comprises one of:
directly receiving the forwarding rule from the service function chain controller; or
receiving the forwarding rule forwarded from the service function chain controller via a software defined network controller in the software defined network.

10. The method of claim 8,
wherein forwarding the packet comprises:
in response to a determination that a header of the packet comprises the match information, performing the first processing action on the packet, and
forwarding the packet to the downstream node communicatively coupled with the first service function based on the address of the first service function.

11. The method of claim 10, wherein the network service header comprises at least one of: an identifier of the service function chain, a protocol type of a payload in the packet, and a context header.

12. The method of claim 10, wherein the match information comprises at least one of: a source address, a source port number, a destination address, a destination port number, a protocol type, an ingress port number, an application type, and user information of the packet.

13. The method of claim 8, wherein the forwarding rule comprises a second flow entry in a second flow table, the second flow entry indicating at least an identifier of the service function chain, a second service function of the set of ordered service functions to which the packet is forwarded, and a second processing action to be performed by the network node on the packet, the second processing action comprising at least one of removal of a network service header from the packet and replacement of a destination address of the packet with an address of the second service function; and
wherein forwarding the packet comprises:
in response to a determination that a header of the packet comprises an identifier of the service function chain in the second flow entry, performing the second processing action on the packet, and
forwarding the packet to the downstream node communicatively coupled with the second service function based on the address of the second service function.

14. The method of claim 8, wherein obtaining the forwarding rule comprises:
in response to a determination, upon reception of the packet, that the packet fails to be forwarded in absence of a matched service function chain, providing, to the service function chain controller, an indication that the packet fails to be forwarded by the network node; and
obtaining the forwarding rule from the service function chain controller.

15. A method implemented at a software defined network controller, comprising:
receiving, from a service function chain controller, respective forwarding rules associated with a service function chain created for a packet, the service function chain comprising a set of ordered service functions that are to process the packet, the respective forwarding rules indicating how a plurality of network nodes in a software defined network forward the packet to the set of ordered service functions in the service function chain; and
providing the respective forwarding rules to the plurality of network nodes,
wherein the respective forwarding rules are configured to the plurality of network nodes directly or indirectly according to a first flow entry configured to a first flow table of a first network node directly or indirectly, the first flow entry indicating at least match information, a network service header of the packet, a first service function of the set of ordered service functions to which the packet is forwarded, and a first processing action to be performed by the first network node on the packet, the first processing action comprising at least one of insertion of the network service header and replacement of a destination address of the packet with an address of the first service function.

16. The method of claim 15, further comprising:
receiving, from the service function chain controller, a request for information about the software defined network; and
in response to the request, providing the information to the service function chain controller.

17. The method of claim 15, further comprising:
receiving, from a network node of the plurality of network nodes, an indication that the packet fails to be forwarded by the network node; and
providing the indication to the service function chain controller.

18. The method of claim 15, further comprising:
mapping a path of the service function chain to a multi-protocol label switching path in the software defined network for transmission of the packet in the software defined network.

19. The method of claim 18, wherein if the packet is interested with a network service header, presence of the network service header of the packet is indicated in a label for the multi-protocol label switching path.

20. A communication device, comprising:
at least one processor; and
at least one memory including computer program code, the at least one memory and computer program code configured to, with the at least one processor, cause the device to perform the method of claim 1.

21. A communication device, comprising:
at least one processor; and
at least one memory including computer program code, the at least one memory and computer program code configured to, with the at least one processor, cause the device to perform the method of claim 8.

22. A communication device, comprising:

at least one processor; and at least one memory including computer program code, the at least one memory and computer program code configured to, with the at least one processor, cause the device to perform the method of claim 15.

23. A computer program embodied on a non-transitory computer readable storage medium, the computer program comprising instructions which, when executed by a processor, cause the processor to implement the method of claim 1.

24. A computer program embodied on a non-transitory computer readable storage medium, the computer program comprising instructions which, when executed by a processor, cause the processor to implement the method of claim 8.

25. A computer program embodied on a non-transitory computer readable storage medium, the computer program comprising instructions which, when executed by a processor, cause the processor to implement the method of claim 15.

\* \* \* \* \*